United States Patent
Asano et al.

(10) Patent No.: US 7,474,484 B2
(45) Date of Patent: Jan. 6, 2009

(54) REPRODUCING APPARATUS AND METHOD, AND RECORDING APPARATUS AND METHOD

(75) Inventors: Ryuichi Asano, Kanagawa (JP); Shingo Nakagawa, Kanagawa (JP); Kaoru Motohashi, Kanagawa (JP); Yoshiaki Kayukawa, Kanagawa (JP); Satoshi Yutani, Kanagawa (JP)

(73) Assignee: Sony Corporation, Tokyo (JP)

( * ) Notice: Subject to any disclaimer, the term of this patent is extended or adjusted under 35 U.S.C. 154(b) by 711 days.

(21) Appl. No.: 10/920,651

(22) Filed: Aug. 18, 2004

(65) Prior Publication Data

US 2005/0078949 A1    Apr. 14, 2005

(30) Foreign Application Priority Data

Aug. 20, 2003    (JP)    ............................. 2003-296661

(51) Int. Cl.
G11B 5/09    (2006.01)
(52) U.S. Cl. ........................................................ 360/48
(58) Field of Classification Search .................... 360/48, 360/13, 69, 75; 711/112, 167, 114; 369/47.14, 369/59.24
See application file for complete search history.

(56) References Cited

U.S. PATENT DOCUMENTS

| | | | | |
|---|---|---|---|---|
| 4,622,602 A | * | 11/1986 | Kutaragi | ...................... 360/48 |
| 5,121,492 A | * | 6/1992 | Saville et al. | .................. 703/13 |
| 5,406,534 A | * | 4/1995 | Hisakado et al. | ......... 369/47.14 |
| 5,652,823 A | * | 7/1997 | Eto | .............................. 386/68 |
| 5,812,733 A | * | 9/1998 | Eto | .............................. 386/68 |
| 6,058,455 A | * | 5/2000 | Islam et al. | .................. 711/114 |
| 6,779,081 B2 | * | 8/2004 | Arakawa et al. | ............. 711/112 |
| 6,826,668 B1 | * | 11/2004 | Hsu et al. | .................... 711/167 |
| 7,095,698 B2 | * | 8/2006 | Uchida | ..................... 369/59.24 |

FOREIGN PATENT DOCUMENTS

| | | |
|---|---|---|
| JP | 1 155555 | 6/1989 |
| JP | 8 54990 | 2/1996 |
| JP | 10 289533 | 10/1998 |

* cited by examiner

*Primary Examiner*—Fred Tzeng
(74) *Attorney, Agent, or Firm*—Frommer Lawrence & Haug LLP; William S. Frommer; Thomas F. Presson

(57) ABSTRACT

A reproducing apparatus and a recording apparatus capable of reducing time to continuously read and record a plurality of data. A readout order of data of a prescribed size composing data specified by a reproduction command from outside is determined so that all the data of the prescribed size can be continuously reproduced while a head goes and returns once in the radiation direction of a disk. The position of the head in the radial direction of the disk is controlled to continuously reproduce the data of the prescribed size in the readout order. The data of the prescribed size reproduced from the disk via the head is rearranged in a correct reproduction order based on the reproduction command and output.

20 Claims, 15 Drawing Sheets

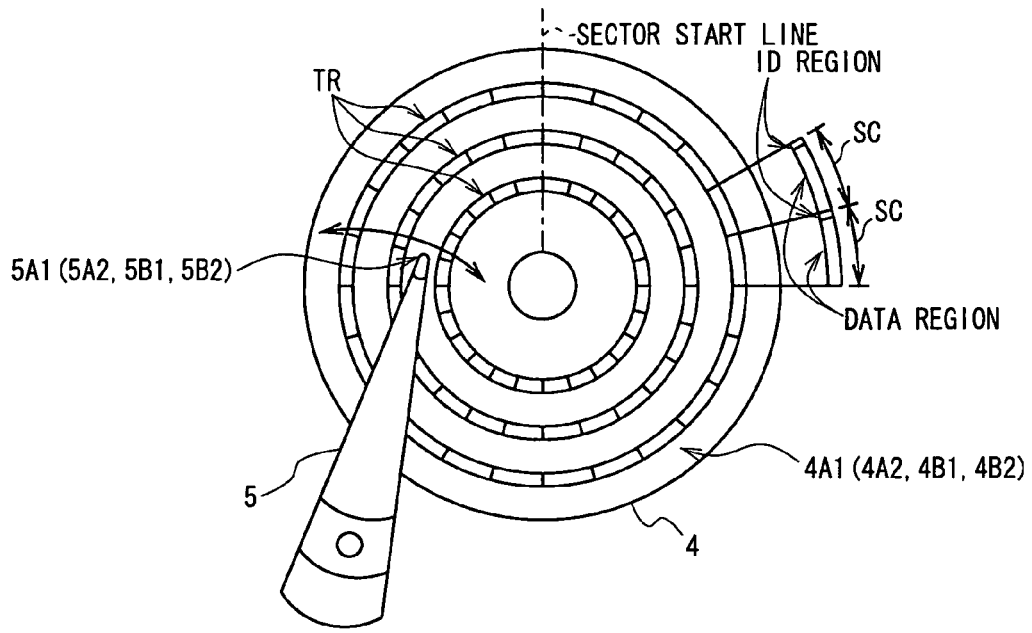
FIG. 2 (RELATED ART)
FIG. 3A (RELATED ART)
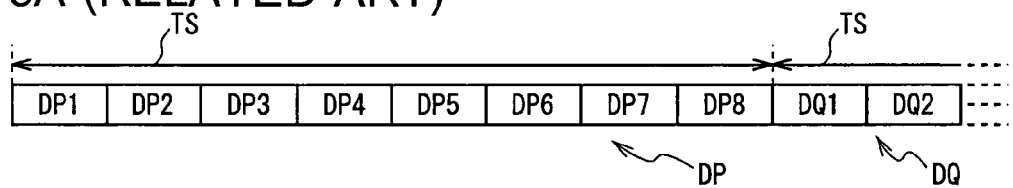
FIG. 3B
(RELATED ART)
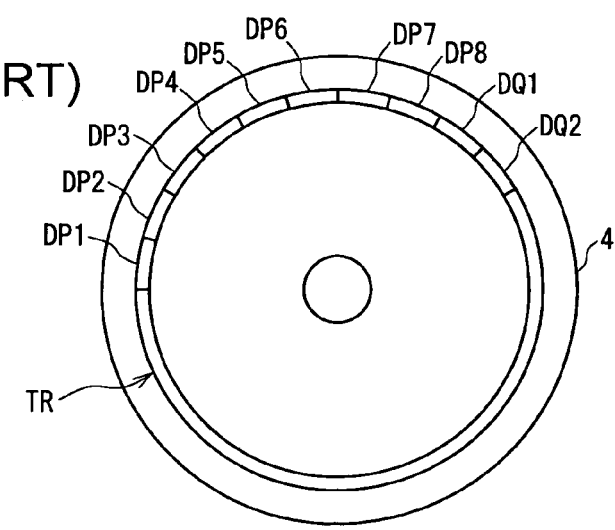

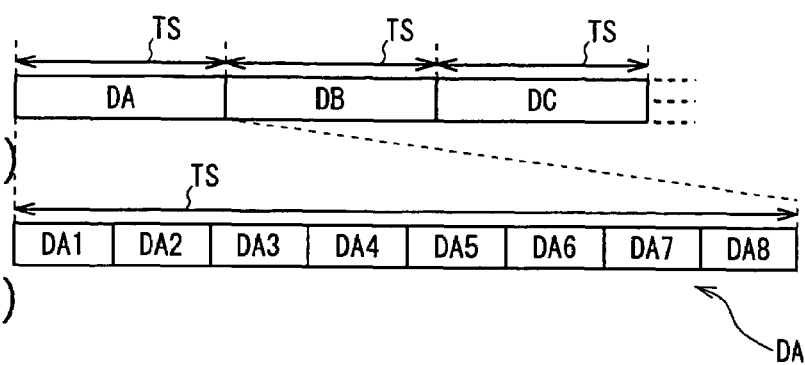
FIG. 4A (RELATED ART)
FIG. 4B (RELATED ART)
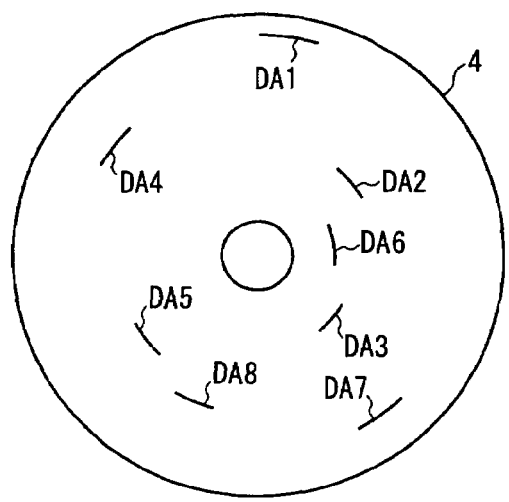
FIG. 4C (RELATED ART)

FIG. 5A (RELATED ART)
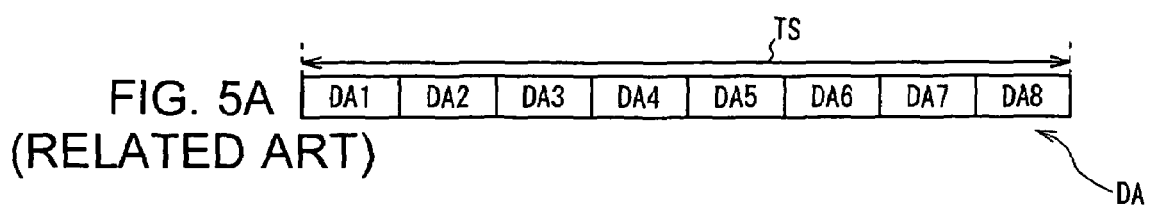
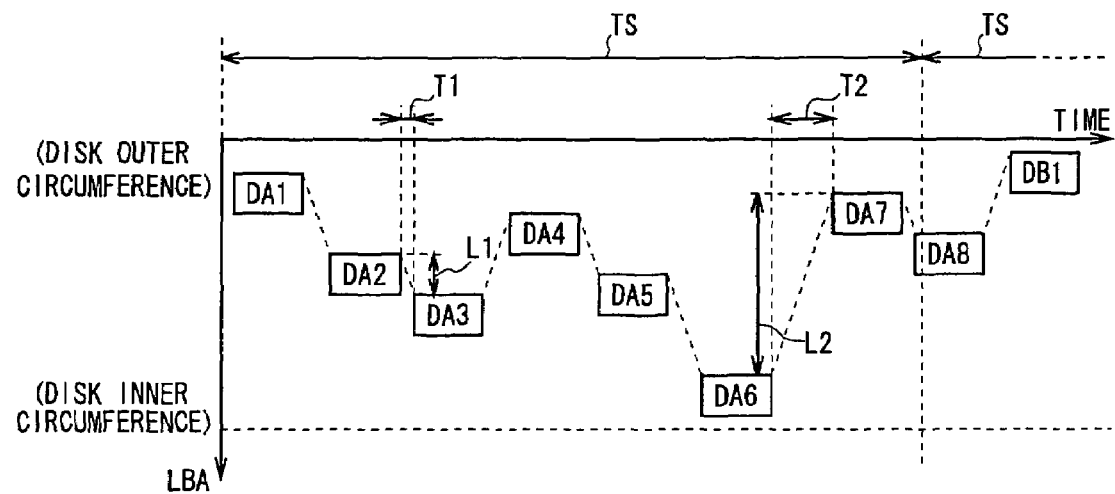
FIG. 5B (RELATED ART)

FIG. 6A
(RELATED ART)
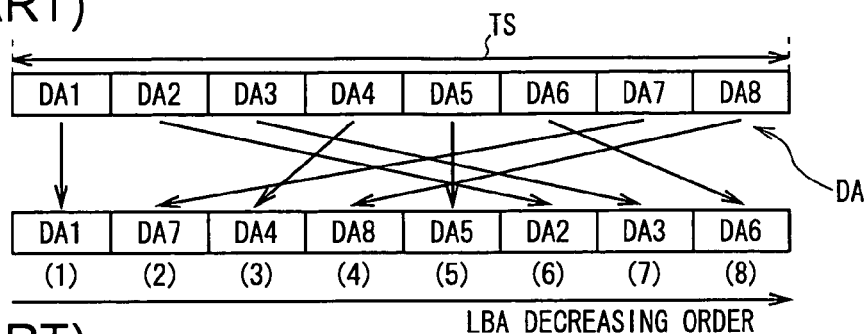
FIG. 6B
(RELATED ART)
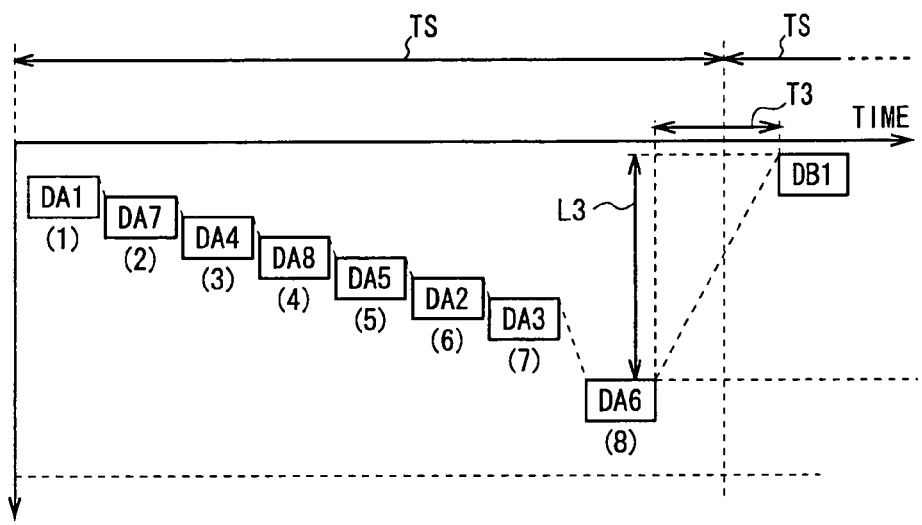
FIG. 6C (RELATED ART)

FIG. 16B

REPRODUCING APPARATUS AND METHOD, AND RECORDING APPARATUS AND METHOD

BACKGROUD OF THE INVENTION

1. Field of the Invention

This invention relates to a reproducing apparatus and method, and a recording apparatus and method and, more particularly, is suitably applied to a video server system, for example.

2. Description of the Related Art

In some video servers, video and audio are encoded into digital data (hereinafter, such data is referred to as audio/video (AV) data) to be recorded in some sectors, which are units for recording, of a randomly accessible recording medium such as a hard disk drive.

FIG. 1 shows a construction of a hard disk drive 1, in which two disks 4 (4A and 4B) are arranged on the output shaft of a motor 3 attached to a case 2. These disks can rotate as the motor 3 rotates.

To a head unit 5, magnetic heads 5A1, 5A2, 5B1, and 5B2 are attached so as to be placed slightly above the recording surfaces 4A1, 4A2, 4B1 and 4B2 of the disks 4A and 4B, respectively.

In addition, in this hard disk drive 1, an axis 2A formed on the case 2 is inserted into an axis hole 5C provided in the head unit 5, so that an actuator (not shown) can rotate the head unit 5 with the axis 2A as a center.

As shown in FIG. 2, each of the recording surfaces 4A1, 4A2, 4B1, and 4B2 of the disks 4A and 4B of the hard disk drive 1 has a plurality of concentric tracks TR which are assigned track numbers in order from the most outer circumference.

Furthermore, each track TR is divided into a plurality of sectors SC. The sectors are each assigned a sector number in order on the basis of a prescribed sector start line on each recording surface 4A1, 4A2, 4B1 and 4B2 so that all magnetic heads 5A1, 5A2, 5B1, and 5B2 are placed on sectors SC with the same sector number of tracks TR with the same track number when the heads 5A1, 5A2, 5B1 and 5B2 are moved on the recording surfaces 4A1, 4A2, 4B1 and 4B2 altogether.

Each sector SC is composed of an ID region and a data region. The ID region contains information for managing the sector SC, which will be described later, and the data region stores divided data of the sector size.

To manage all sectors SC, the hard disk drive 1 stores logical block addresses (LBA) assigned to all sectors SC, not the track numbers nor sector numbers, in the ID regions of the sectors SC. The LBAs are assigned so that a sector SC of the most outer circumference track TR of the recording surface 4A2 follows a sector SC of the most outer circumference track TR of the recording surface 4A1, for example.

This shortens a movement distance (hereinafter, referred to as seek distance) of the magnetic head 5A1 (5A2, 5B1, 5B2) for a case where the magnetic head 5A1 (5A2, 5B1, 5B2) is positioned onto a sector SC (hereinafter, this operation is referred to as seek) by moving the head unit 5 to read/write data from/in sectors having continuous LBAs.

In addition, a seek distance of the head unit 5 from the most outer circumference of the disk 4A (4B) toward the inner circumference is almost proportional with an LBA number which is assigned starting with the most outer circumference of the disk 4A (4B).

By the way, in general, in a video server system, to record a large amount of AV data as a file on the hard disk drive 1, the AV data is divided into a plurality of continuous data DP, DQ, and further the data DP, DQ, . . . are each divided into a plurality of divided data DP1 to DP8, . . . so as to match the size of the data regions of the sectors SC, as shown in FIG. 3A.

In addition, in the video server system, a time limit (hereinafter, referred to as time slot TS) to read the data DP (DQ, . . . ) is set. Reading all divided data DP1 to DP8 of the data DP within a time slot TS means continuous output of the AV data.

In actual, in the hard disk drive 1, as shown in FIG. 3B, continuous divided data DP1 to DP8 are sequentially recorded in continuous sectors SC (that is, sectors SC with continuous LBA numbers), so that the divided data DP1 to DP8 can be read continuously with only slight seeking operation of the head unit 5 (FIG. 2).

On the other hand, in a case where an editing device connected to the video server system extracts and joins short data from a plurality of AV data, the video server system is required to output the plurality of AV data continuously in response to a request of the editing device.

At this time, the hard disk drive 1 sequentially reads the data DA, DB, DC, . . . corresponding to the plurality of AV data requested, as shown in FIG. 4A. However, as shown in FIGS. 4B and 4C, in a case where the divided data DA1 to DA8 composing the data DA comes from different AV data, the divided data DA1 to DA8 may be stored at dispersed locations on a recording surface 4A1 (4A2, 4B1, 4B2) of a disk 4A (4B).

In other words, the hard disk drive 1 may have to sequentially read the divided data DA1 to DA8 for the data DA shown in FIG. 5A, from sectors with discontinuous LBAs as shown in FIG. 5B.

In this case, to read the divided data continuously, the hard disk drive 1 has to make the head unit 5 seek by a distance corresponding to a difference between the LBAs of two continuous divided data, which takes time (hereinafter, referred to as seek time) according to the seek distance.

Therefore, when a difference L1 of LBAs is relatively small, like the divided data DA2 and DA3, seek time T1 is short because of a short seek distance. When a distance L2 of LBAs is relatively large, like the divided data DA6 and DA7, on the contrary, seek time TS is long because of a long seek distance.

Specifically, in a case of a long seek distance, it is hard to control the magnetic head 5A1 (5A2, 5B1, 5B2) of the head unit 5 so as to place it just on a track TR having a desired sector SC. Therefore, the magnetic head 5A1 (5A2, 5B1, 5B2) may be placed on a different track TR with high possibility. In such a case, the magnetic head 5A1 (5A2, 5B1, 5B2) of the head unit 5 can position itself on the track TR by a next track seeking process (hereinafter, referred to as retry). Further, we have to wait for the disk 4A (4B) to rotate once in order to read data from the sector SC. This process requires a long time.

As a result, it takes a long seek time to read all the divided data DA1 to DA8 continuously and the divided data DA1 to DA8 may not be read within the time slot TS. In this case, the video server system disconnects the AV data. This is a problem.

In addition, the hard disk drive 1 is a randomly accessible recording medium. When data is recorded and deleted repeatedly, sectors SC (hereinafter, referred to as free sector) which can contain data exist at various positions on a recording surface 4A1 (4A2, 4B1, 4B2) of a disk 4A (4B).

Therefore, when AV data is recorded in response to a command from the editing device, even if the data DA, DB, . . . composing the AV data to be recorded are continuous (FIG.

4), the video server system may write the data in free sectors existing at various positions on a recording surface 4A1 (4A2, 4B1, 4B2).

Therefore, similar to the above-described readout case, this recording process may not be completed within a time slot because of a long seek distance and long seek time. As a result, recorded AV data may be discontinuous because of failed recording of some data. This is also a problem.

To solve the problems, such a technique has been proposed that a readout order or recording order of divided data D1 to D8 is previously rearranged as shown in FIG. 6 (for example, Japanese Patent Application Laid-Open No. 10-233059, Page 18, FIG. 11).

That is, at a time of reproducing AV data, a hard disk drive 1 of a video server system reads out the divided data DA1 to DA8 of the data DA shown in FIG. 6A in a decreasing order of LBAs as shown in FIG. 6B, and then rearranges the read divided data DA1 to DA8. As a result, the LBAs of the divided data DA1 to DA8 are arranged continuously at a time of readout, so as to reduce a total seek time to read all the divided data DA1 to DA8. That is, since the divided data DA1 to DA8 can be all read out within a time slot ST, the AV data can be output continuously.

On the other hand, at a time of recording AV data, the hard disk drive 1 of the video server system records the divided data DA1 to DA8 of the data DA (FIG. 6A) in a decreasing order of LBAs (FIG. 6B). As a result, the LBAs of the divided data DA1 to DA8 are arranged continuously, so as to reduce a total seek time to record all the divided data DA1 to DA8. That is, since the divided data DA1 to DA8 can be all recorded within the time slot ST, the AV data can be recorded continuously without fail.

By the way, actually, since AV data is composed of a plurality of data DA, DB, . . . which is assigned a plurality of time slots TS, the data DA, DB, . . . should be all read within corresponding time slots.

However, the above video server system reads the divided data DB1 of the data DB existing on the most outer side after the divided data DA6 of the data DA existing on the most inner side. Therefore, the LBAs of these divided data are discontinuous at a time of reading the data DA and DB continuously, so that a seek distance L3 and a seek time T3 between the divided data DA6 and DB1 may be both very long as shown in FIG. 6C.

That is, although the video server system can read all the data DA within a time slot TS, it takes a long seek time before starting the readout of the data DB after completing the readout of the data DA. As a result, the next data DB may not be read out within the corresponding time slot TS, resulting in discontinuing the AV data.

On the other hand, at a time of recording the data DA and DB to record AV data, similarly to the reproduction case, the LBAs of the divided data may be discontinuous. Therefore, a seek distance L3 and a seek time T3 between the divided data DA6 and DB1 may be very long. As a result, although the data DA can be recorded within the time slot TS, the next data DB may not be recorded within the corresponding time slot TS, resulting in recording of discontinuous AV data.

SUMMARY OF THE INVENTION

In view of the foregoing, an object of this invention is to provide a reproducing apparatus and method, and a recording apparatus and method, which are capable of reducing time to read and write plural pieces of data continuously in order to reproduce and record the data.

The foregoing object and other objects of the invention have been achieved by the provision of a reproducing apparatus for reproducing divided data of a prescribed size from a disk with a head which moves in a radial direction of the disk rotating, in response to a reproduction command given from outside. The reproducing apparatus comprises: a readout order determination means for determining a readout order of the divided data of the prescribed size so as to continuously reproduce all the divided data of the prescribed size composing data requested by the reproduction command while the head goes and return once in the radial direction of the disk; a head position control means for controlling the position of the head in the radial direction of the disk so as to sequentially reproduce the divided data of the prescribed size in the readout order determined by the readout order determination means; and a rearrangement means for rearranging and outputting the divided data of the prescribed size reproduced from the disk via the head, in a correct reproduction order based on the reproduction command.

As a result, this reproducing apparatus is capable of reducing movement time of the head by shortening a movement distance of the head in both cases of continuously reading out divided data of a prescribed size composing one piece of data and continuously reading out divided data of the prescribed size composing two pieces of data.

Further, this invention proposes a reproducing method of reproducing divided data of a prescribed size from a disk with a head which moves in the radial direction of the disk rotating, in response to a reproduction command given from outside. This reproducing method comprises: a first step of determining a readout order of the divided data of the prescribed size so as to continuously reproduce all the divided data of the prescribed size composing data requested by the reproduction command while the head goes and return once in the radial direction of the disk; a second step of controlling the position of the head in the radial direction of the disk so as to sequentially reproduce the divided data of the prescribed size in the readout order determined; and a third step of rearranging and outputting the divided data of the prescribed size reproduced from the disk via the head, in a correct reproduction order based on the reproduction command.

As a result, this reproducing method is capable of reducing movement time of the head by shortening a movement distance of the head in both cases of continuously reading divided data of a prescribed size composing one piece of data and of continuously reading divided data of the prescribed size composing two pieces of data.

Still further, this invention proposes a recording apparatus for dividing data given from outside into a prescribed size and recording the divided data on a disk with a head which moves in the radial direction of the disk rotating, in response to a recording command given from the outside. This recording apparatus comprises: a recording order determination means for determining a recording order of the divided data of the prescribed size so as to continuously record all the divided data of the prescribed size while the head goes and returns once in the radial direction of the disk; and a head position control means for controlling the position of the head in the radial direction of the disk so as to sequentially record the divided data of the prescribed size in the recording order.

As a result, this recording apparatus is capable of reducing movement time of the head by shortening a movement distance of the head in both cases of continuously recording divided data of a prescribed size composing one piece of data and of continuously recording divided data of the prescribed size composing two pieces of data.

Still further, this invention proposes a recording method of dividing data given from outside into a prescribed size and recording the divided data on a disk with a head which moves in the radial direction of the disk rotating, in response to a recording command given from the outside. This recording method comprises: a first step of determining a recording order of the divided data of the prescribed size so as to continuously record all the divided data of the prescribed size while the head goes and returns once in the radial direction of the disk; and a second step of controlling the position of the head in the radial direction of the disk so as to sequentially record the divided data of the prescribed size in the recording order.

As a result, this recording method is capable of reducing movement time of the head by shortening a movement distance of the head in both cases of continuously recording divided data of a prescribed size composing one piece of data and of continuously recording divided data of the prescribed size composing two pieces of data.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 2 is a schematic diagram explaining structures of tracks and sectors of a disk;

FIGS. 3A and 3B are schematic diagrams explaining a structure of continuous data and their recording positions on a disk;

FIGS. 4A to 4C are schematic diagrams explaining a structure of dispersed data and their recording positions on a disk;

FIGS. 5A and 5B and 6A to 6C are schematic diagrams explaining conventional divided data readout orders and recording orders (1) and (2);

FIG. 16A to 16C are schematic diagrams explaining divided data readout order and recording order according to a third embodiment;

DETAILED DESCRIPTION OF THE EMBODIMENT

Preferred embodiments of this invention will be described with reference to the accompanying drawings:

(1) First Embodiment (1-1) Construction of Video Server System 1

Figure 7:
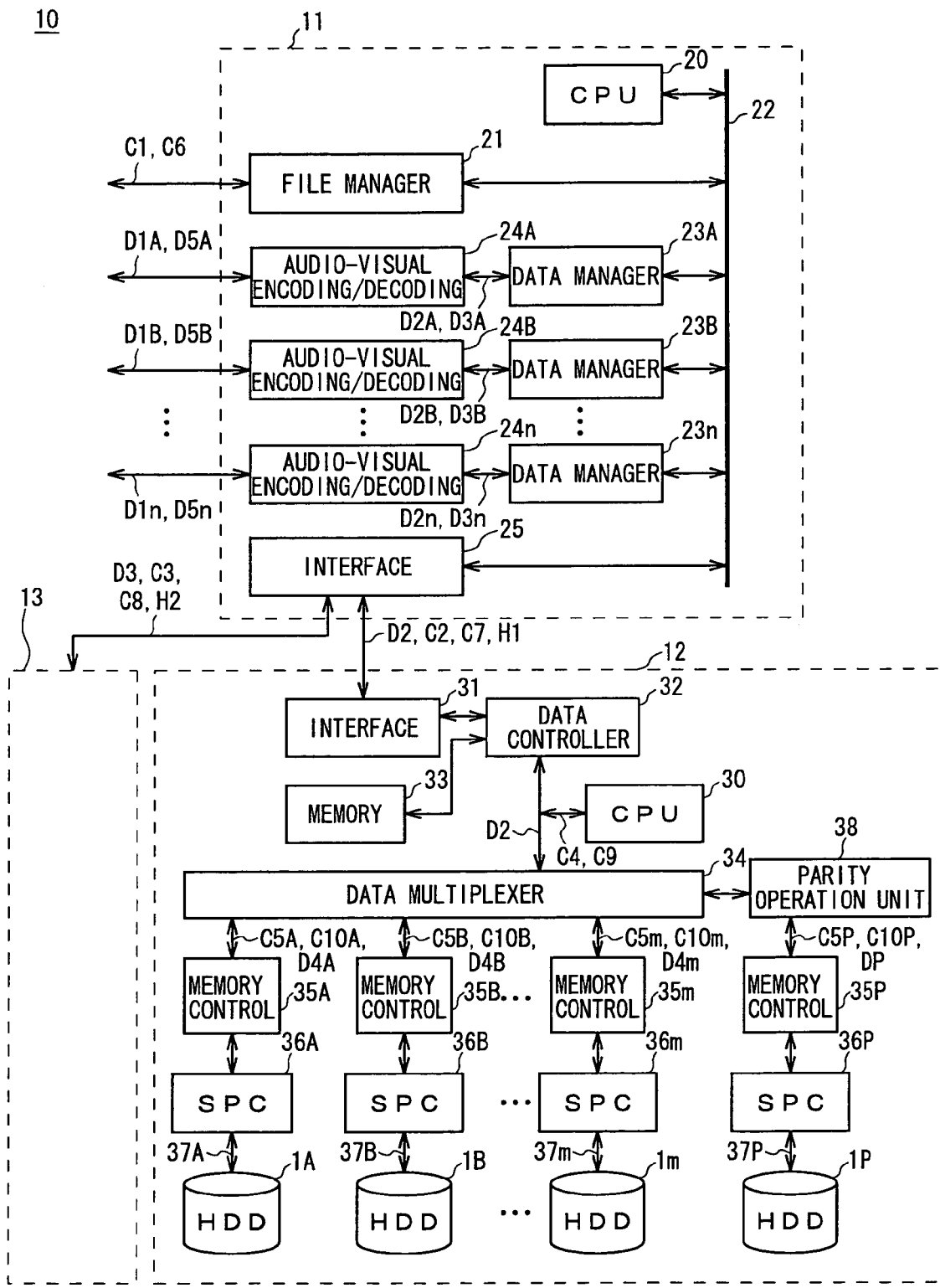
FIG. 7 is a block diagram showing a construction of a video server system.

Referring to FIG. 7, reference numeral 10 shows a video server system according to this embodiment, which is composed of a processor unit 11, a video redundant arrays of inexpensive disk (RAID) unit 12 and an audio RAID unit 13.

The processor unit 11 is entirely controlled by a CPU 20. For example, when a file manager 21 receives a recording command C1 instructing the recording of AV data D1 (D1A to D1n) from an external control device not shown, the CPU 20 recognizes this matter via a bus 22.

The CPU 20 analyzes this recording command C1 and sends a recording command C1A of the AV data D1 to a data manager 23 (23A to 23n) via the bus 22 according to the received command.

Upon reception of the recording command C1A of the AV data, the data manager 23 asks the file manager 21 for information on a file to be used to newly record the AV data and obtain LBA information etc., in hard disk drives 1 (1A to 1m, 1P), via the bus 22.

Then the data manager 23 performs prescribed encoding etc., on the received AV data D1 with an audio-visual encoding/decoding processor 24 (24A to 24n) to obtain video data D2 (D2A to D2n) and audio data D3 (D3A to D3n). The data manager 23 creates a video recording command C2 and audio recording command C3 including the obtained LBA information, and sends the video data D2 and the video recording command C2 to the video RAID unit 12 and sends the audio data D3 and the audio recording command C3 to the audio RAID unit 13, via the bus 22 and an interface 25.

The video RAID unit 12 is entirely controlled by a CPU 30. When it receives the video recording command C2 and the video data D2 via an interface 31, it temporarily stores them in a memory 33, and sends, via a data controller 32, the video recording command C2 to the CPU 30 and the video data D2 to the a data multiplexer 34.

The CPU 30 creates a SCSI Protocol Controller (SPC) recording command C4 based on the LBA information and so on included in the video recording command C2 and sends it to the data multiplexer 34.

The data multiplexer 34 divides the SPC recording command C4 into divided SPC recording commands C5 (C5A to C5m, C5P) and sends these commands to memory control units 35A to 35m corresponding to the hard disk drives 1A to 1m for video data storage, and a parity operation unit 38, respectively. In addition, the data multiplexer 34 divides the video data D2 into divided video data D4 (D4A to D4m) of one byte and sends them to the memory control units 35A to 35m, respectively, and all the divided video data D4 to the parity operation unit 38.

At this time, the parity operation unit 38 calculates parity data DP based on the received divided video data D4 and sends it to the memory control unit 35P together with the divided SPC recording command C5P.

Then the divided SPC recording commands C5A to C5m and the divided video data D4 temporarily stored in the memory control units 35A to 35m and the divided SPC recording command C5P and the parity data DP temporarily stored in the memory control unit 35P are read by corresponding SPCs 36 (36A to 36m, 36P).

The SPCs 36 send SCSI commands based on the divided SPC recording commands C5 to the corresponding hard disk drives 1 via SCSI interfaces 37 (37A to 37m, 37P), to record the divided video data D4 and the parity data DP at specified LBAs in the hard disk drives 1.

The audio RAID unit 13, on the other hand, has an internal construction similar to the video RAID unit 12, and is designed to record the audio data D3 in hard disk drives, similarly to the video RAID unit 12.

As described above, when a data manager 23 of the processor unit 11 receives a recording command C1 of AV data D1 from the CPU 20, it sends the video data D2 and the audio data D3, which are obtained by encoding the received AV data D1, and the video recording command C2 and the audio recording command C3 to the video RAID unit 12 and the audio RAID unit 13, so as to record the video data D2 and audio data D3 on the hard disk drives 1.

When the file manager 21 of the processor unit 11 receives a reproduction command C6 instructing the reproduction of AV data D5 (D5A to D5n) from an editing device not shown, on the other hand, the CPU 20 recognizes this matter via the bus 22.

The CPU 20 analyzes the reproduction command C6 and sends a reproduction command C6A of the AV data D5 to a data manager 23 via the bus 22 according to the analysis result.

Upon reception of the reproduction command C6A, the data manager 23 asks the file manager 21 for information on a file corresponding to the AV data D5 and obtain LBA information etc., in the hard disk drives 1, via the bus 22.

Then the data manager 23 creates and sends a video readout command C7 and an audio readout command C8 including the obtained LBA information, to the video RAID unit 12 and the audio RAID unit 13, respectively, via the bus 22 and the interface 25.

When the video RAID unit 12 receives the video readout command C7 via the interface 31, it sends the video readout command C7 to the CPU 30 via the data controller 32.

The CPU 30 creates and sends an SPC readout command C9 based on the LBA information included in the video readout command C7, to the data multiplexer 34.

The data multiplexer 34 divides the SPC readout command C9 into divided SPC readout commands C10 (C10A to C10m, C10P) and sends them to the memory control units 35A to 35m corresponding to the hard disk drives 1A to 1m for video data storage and the parity operation unit 38.

At this time, the parity operation unit 38 sends the divided SPC readout command C10P to the memory control unit 35P as it is.

Then the SPCs 36 read the divided SPC readout commands C10 temporarily stored in the corresponding memory control units 35 (35A to 35m, 35P), read the divided data D4 and the parity data DP from the specified LBAs in the corresponding hard disk drives 1 via the SCSI interfaces 37, and temporarily store them in the corresponding memory control units 35.

In this connection, the hard disk drives 1 read the data from specified LBAs in an order specified by the divided SPC readout commands C10.

The parity operation unit 38 reads the parity data DP from the memory control unit 35P and sends it to the data multiplexer 34. The data multiplexer 34 restores the video data D2 from the divided video data D4 read from the memory control units 35A to 35m and the parity data DP and sends it to the data controller 32.

The data controller 32 sends header information H1 determined by the CPU 30 and the video data D2, to the processor unit 1 via the interface 31.

The audio RAID unit 13, on the other hand, reads the audio data D3 based on the audio readout command C8 and sends it to the processor unit 11 together with header information H2, similarly to the video RAID unit 12.

The data manager 23 of the processor unit 11 obtain the header information H1 and H2, the video data D2 and audio data D3 via the interface 25, send the video data D2 and audio data D3 to the audio-visual encoding/decoding processor 24 to perform prescribed encoding on them, and then output the resultant as the AV data D5.

As described above, when a data manager 23 of the processor unit 11 receive a reproduction command C6 of AV data from the CPU 20, it sends the video readout command C7 and audio readout command C8 including LBA information for the data in the hard disk drives 1 to the video RAID unit 12 and the audio RAID unit 13, respectively, to obtain the video data D2 and the audio data D3, resulting in outputting them as the AV data D5 through the audio-visual encoding/decoding unit 24.

(1-2) Readout Order of Divided Data According to First Embodiment

By the way, to reproduce AV data D5 from a hard disk drive 1 of the video RAID unit 12 and the audio RAID unit 13, a data manager 23 (23A to 23n) reads its divided data in an order determined based on their LBAs.

Since the AV data 5 is requested from an editing device, for example, the divided data DA1 to DA8 of data DA are stored in discontinuous sectors SC (that is, LBAs) on the disk 4 of the hard disk drive 1 as shown in FIG. 5.

Figure 8A:
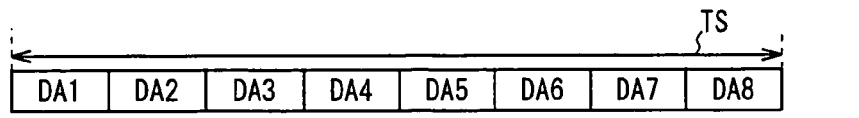
FIG. 8A to 8D are schematic diagram explaining a readout order and recording order of divided data according to a first embodiment.

The data manager 23 has to read all the divided data DA1 to DA8 within a time slot TS, and further has to send the divided data DA1 to DA8 to the audio-visual encoding/decoding processor 24 in a reproduction order in a time series, as shown in FIG. 8A.

Figure 8B:
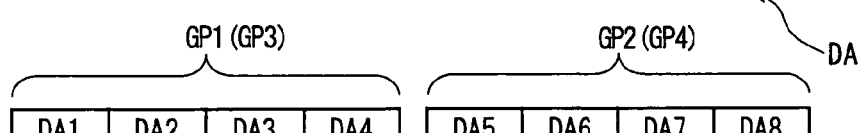

For this purpose, the data manager 23 divides the divided data D1 to D8 arranged in the reproduction order into a first group GP1 (divided data DA1 to DA4) and a second group GP2 (divided data DA5 to DA8) as shown in FIG. 8B.

Figure 8C:
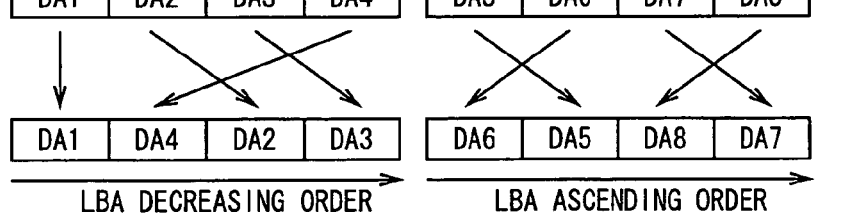

Then the data manager 23 determines a first part readout order by rearranging the divided data DA1 to DA4 of the first group GP1 into a decreasing order of LBAs (hereinafter, referred to as an LBA decreasing order) (in this case, in an order of DA1, DA4, DA2, DA3), and also determines a second part readout order by rearranging the divided data DA5 to DA8 of the second group GP2 into an ascending order of LBAs (hereinafter, referred to as an LBA ascending order) (in this case, in an order of DA6, DA5, DA8, DA7) as shown in FIG. 8C.

Then the data manager 23 determines a readout order of the divided data DA1 to DA8 so that the second part readout order comes after the first part readout order (in this case, in an order of DA1, DA4, DA2, DA3, DA6, DA5, DA8, and DA7).

In addition, the data manger 23 similarly determines a readout order of the divide data for each of the following data DB, . . . .

Figure 8D:
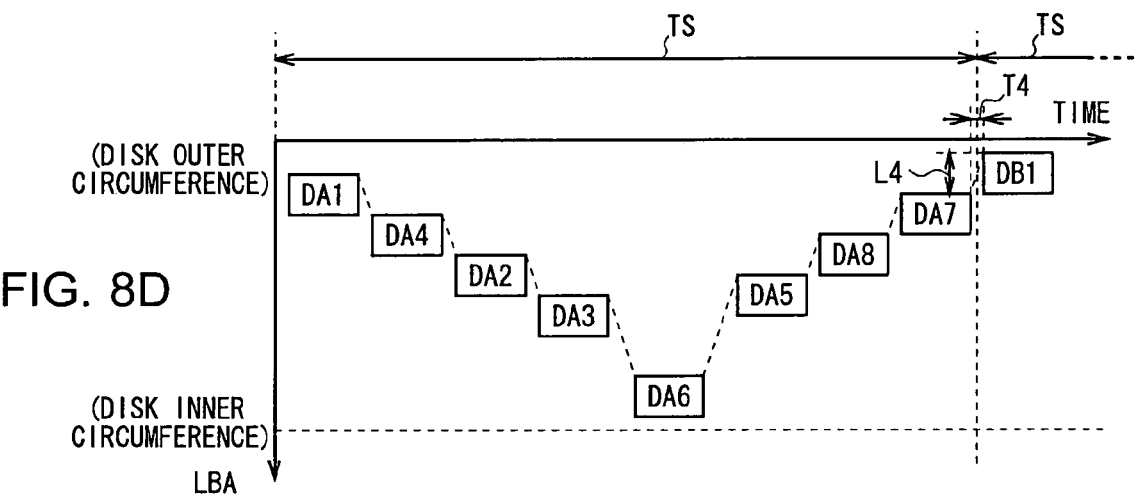

At this time, as shown in FIG. 8D, the storage positions of the divided data DA1, DA4, DA2, DA3 and DA6 in the readout order are continuously arranged from the outer circumference towards the inner circumference in order and the storage positions of the divided data DA6, DA5, DA8, and DA7 in the readout order are continuously arranged from the inner circumference toward the outer circumference in order, the divided data DA6 existing on the most inner circumference side.

As a result, the hard disk drive 1 can shorten a total seek distance of the head unit 5 to read all the divided data DA1 to DA8 of the data DA, at least to one-round in the radial direction of the disk 4, thereby reducing total seek time. This can significantly increase a possibility of reading all the divided data DA1 to DA8 within the time slot TS.

In addition, the last divided data DA7 of the data DA and the first divided data DB1 of the data DB are both stored on the outer circumference side, which results in a short seek distance L4 and also short seek time T4. Comparing with a case of FIG. 6, in cases of reading not only the data DA but also the data DA and DB continuously, the LBAs of their divided data are continuous, which significantly reduces a possibility of long track seeking operation. Since a possibility of retry for the track seeking operation is reduced as well, total seek time can be reduced. This can significantly increase a possibility of reading all the divided data of the data DB within the time slot TS.

After the data manager 23 sequentially reads the divided data DA1 to DA8 in the readout order, it rearranges and sends the divided data DA1 to DA8 into the reproduction order (FIG. 8A) to the audio-visual encoding/decoding processor 24 (FIG. 7) as the data DA.

In addition, the data manger 23 similarly determines a readout order for each of the following data DB, DC, . . . , reads their divided data in the readout orders from the hard disk drive 1 continuously, and rearranges and sends them in their reproduction orders to the audio-visual encoding/decoding processor 24 sequentially.

As described above, the data manger 23 determines a readout order for each of the data DA, DB, DC, . . . , continuously reads their divided data from the hard disk drive 1 in their readout orders, and rearranges them into their reproduction orders, so as to output the data DA, DB, DC, . . . continuously, thus making it possible to continuously output the AV data D5 via the audio-visual encoding/decoding processor 24.

(1-3) Data Readout Procedure of Data Manager 23

Figure 9:
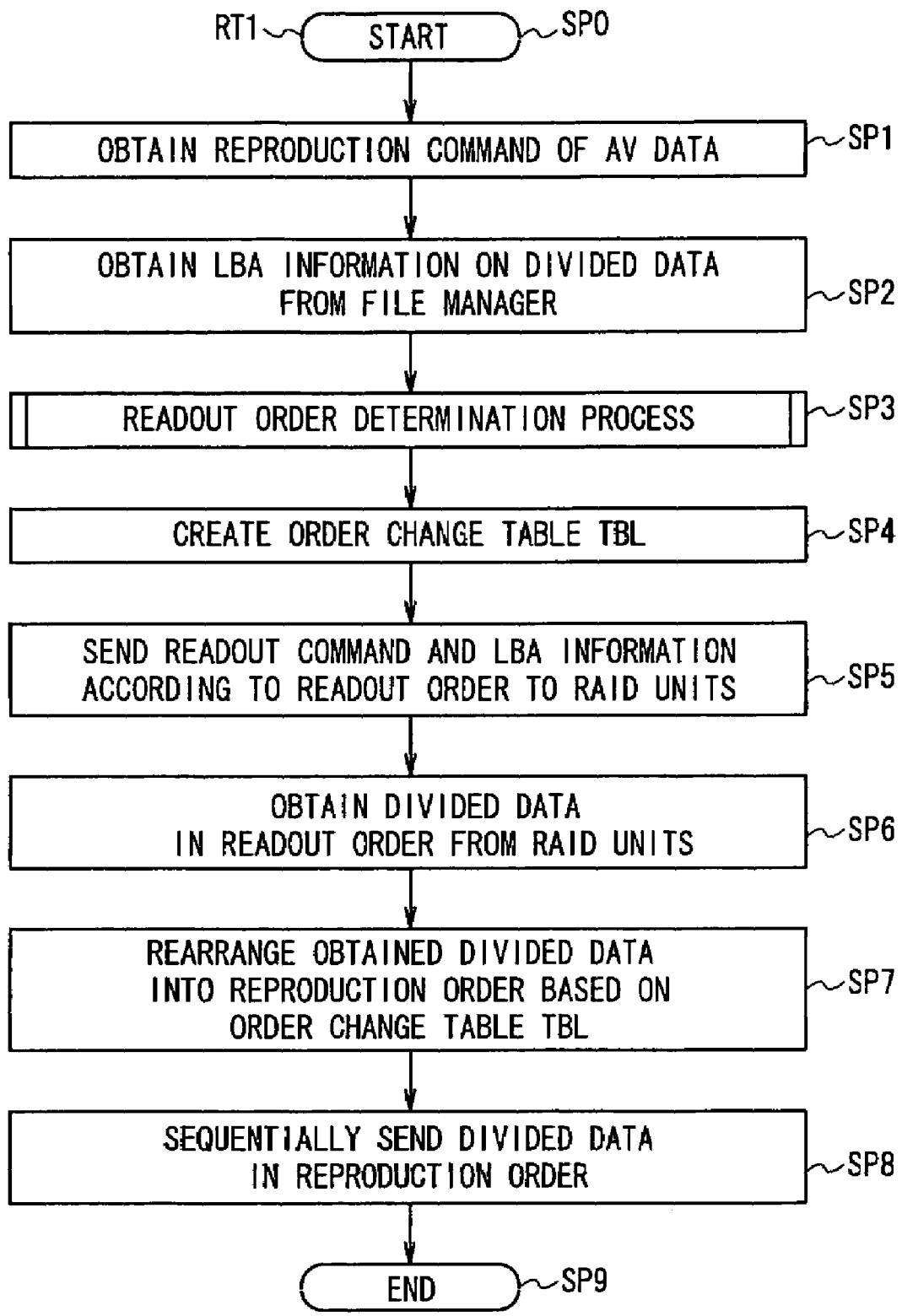
FIG. 9 is a flowchart showing a data readout procedure.

When a data manager 23 of the video server system 1 receives a reproduction command C6A of AV data from the CPU 20, it reads the data by specifying LBAs of the data on a hard disk drive as described above, with a data readout procedure RT1 shown in FIG. 9.

Figure 1:
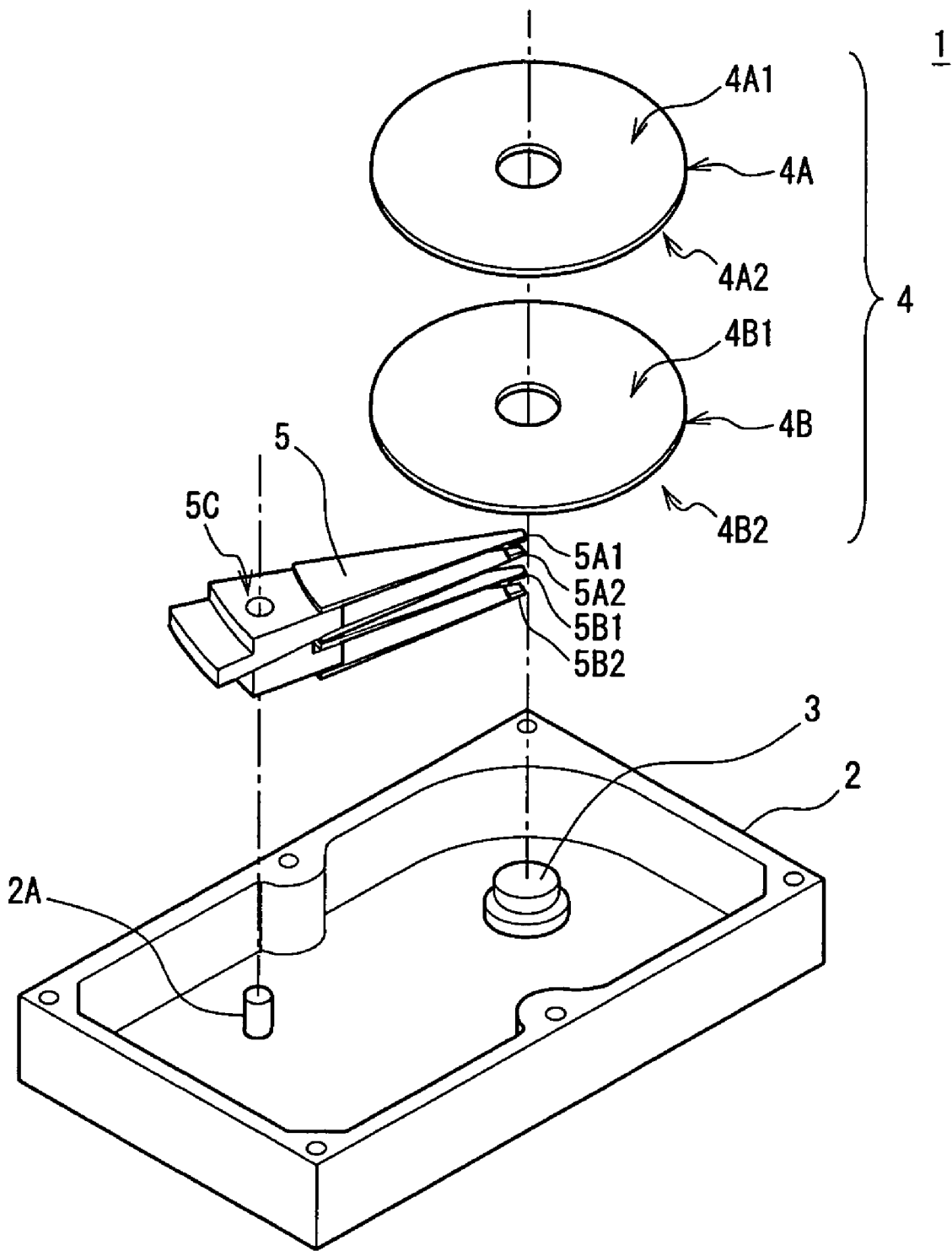
FIG. 1 is a schematic perspective view showing a construction of a hard disk drive.

In actual, the data manager 23 starts this data readout procedure RT1 from step SP0 under the control of the CPU 20. When the data manager 23 confirms the reception of the reproduction command C6A from the CPU 20 (FIG. 1) at step SP1, it goes on to step SP2 where it obtains LBA information on the divided data of the file corresponding to the AV data D5 specified by the reproduction command C6.

Then the data manager 23 goes on to step SP3 to determine a readout order of the divided data with a readout order determination process which will be described later, and goes on to step SP4 to create an order change table TBL indicating a correspondence between the reproduction order and the readout order.

Then the data manager 23 goes on to step SP5 to sequentially send the video readout command C7 (audio readout command C8) and the LBA information on the divided data in the readout order, to the video RAID unit 12 (audio RAID unit 13).

At this time, the video RAID unit 12 and the audio RAID unit 13 output the video data D2 and the audio data D3 composed of the divided data based on the LBA information, in response to the video readout command C7 and the audio readout command C8 from the data manger 23.

The data manager 23 goes on to step SP6 to obtain the header information H1 (H2) and the video data D2 (audio data D3) composed of the divided data arranged in the readout order from the video RAID unit 12 (audio RAID unit 13) via the interface 25 and the bus 22. The data manager 23 goes on to step SP7 to rearrange the divided data of the video data D2 (audio data D3) based on the order change table TBL from the readout order to the reproduction order.

Then the data manager 23 goes on to step SP8 to send the divided data to the audio-visual encoding/decoding processor 24 in the reproduction order, thereby outputting the AV data D5. Then the data manager 23 goes on to step SP9 where this data readout procedure RT1 is completed.

As described above, the data manager 23 sequentially reads the divided data composing the video data D2 (audio data D3) from the hard disk drive 1 in the readout order, and sends them in the reproduction order.

(1-4) Readout Order Determination Procedure According to First Embodiment

Figure 10:
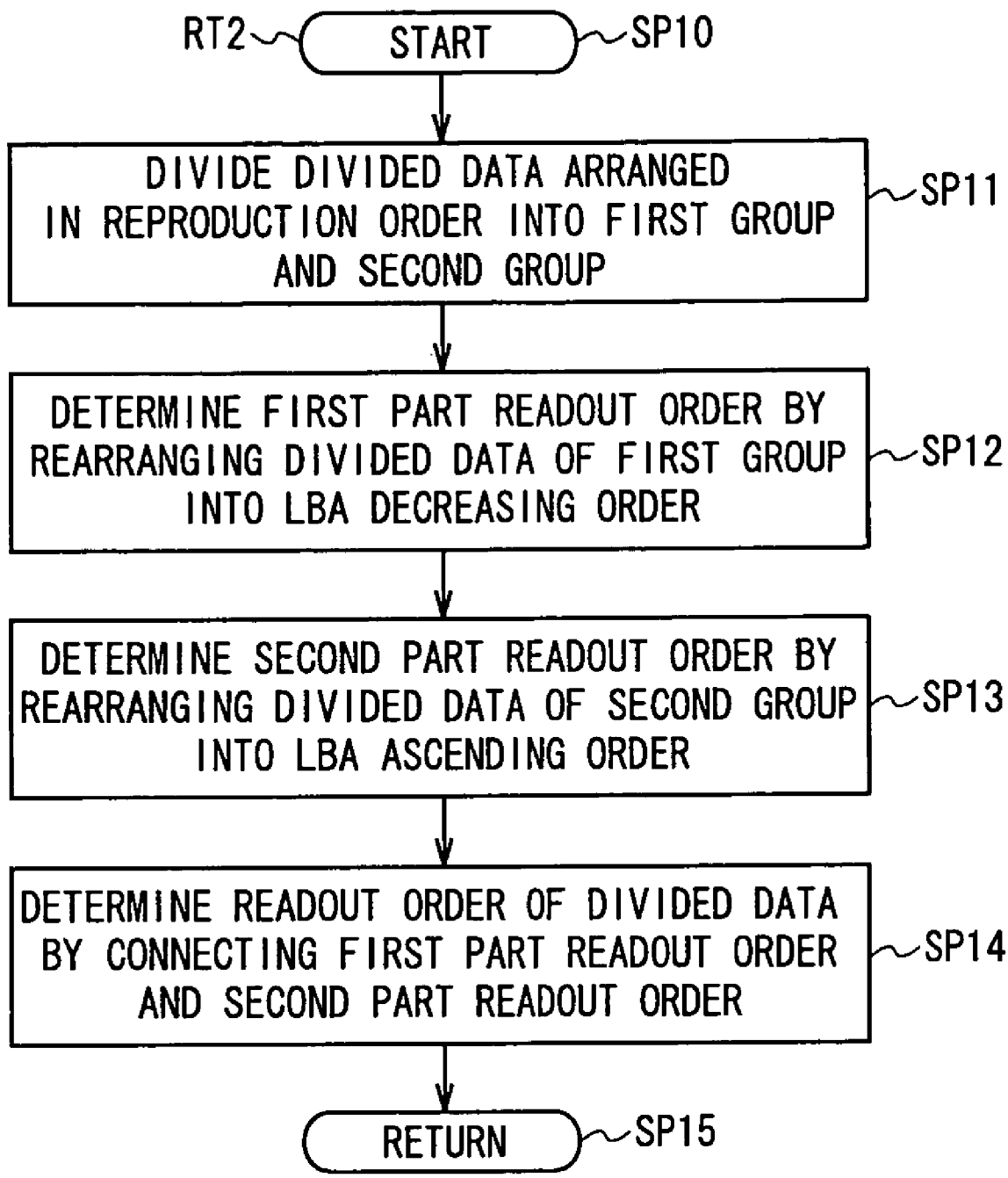
FIG. 10 is a flowchart showing a readout order determination procedure according to the first embodiment.

The readout order determination process of the data manager 23 of the above step SP3 will be now described with a readout order determination procedure RT2 shown in FIG. 10.

When the data manager 23 obtains the LBA information on the divided data in the file corresponding to the AV data D5, it starts this readout order determination procedure RT2 from step SP10. At step SP11, the data manager 23 divides the divided data DA1 to DA8 arranged in the reproduction order into a first group GP1 and a second group GP2 (FIG. 8B).

The data manager 23 goes on to step SP12 to determine a first part readout order by rearranging the divided data of the first group GP1 into an LBA decreasing order, and goes on to step SP13 to determine a second part readout order by rearranging the divided data of the second group GP2 into an LBA ascending order (FIG. 8C).

The data manager 23 goes on to step SP14 to determine a readout order so that the second part readout order comes after the first part readout order, and then goes on to step SP15 where this readout order determination procedure RT2 is completed.

As described above, the data manager 23 determines the readout order based on the LBA information of the divided data.

(1-5) Recording Order of Divided Data According to First Embodiment

In recording AV data D1 on a hard disk drive 1 of the video RAID unit 12 and the audio RAID unit 13, a data manager 23 records the divided data of the data after rearranging the divided data in an order determined based on LBAs.

The AV data D1 is requested from an editing device, for example, and divided into continuous data DA, DB, . . . , for each time slot TS, and further each data DA, DB, . . . , is divided into divided data DA1 to DA8 so as to match the size of sectors SC of the hard disk drive 1 (FIGS. 4A and 4B).

Since the hard disk drive 1 randomly and repeatedly records and deletes data, free sectors exist at not continuous positions but dispersed positions on a recording surface 4A1 (4A2, 4B1, 4B2) of the disk 4A (4B) (FIG. 4C).

Therefore, for example, as shown in FIG. 8A, the data manager 23 has to record all the divided data DA1 to DA8 in these dispersed free sectors within a time slot TS.

For this purpose, as shown in FIG. 8B, the data manager 23 divides the divided data DA1 to DA8 arranged in a normal order into a third group GP3 (divided data DA1 to DA4) and a fourth group GP4 (divided data DA5 to DA8).

Then the data manager 23, as shown in FIG. 8C, determines a first part recording order by rearranging the divided data DA1 to DA4 of the third group GP3 into a decreasing order of LBAs (hereinafter, referred to as an LBA decreasing order) (in this case, in an order of DA1, DA4, DA2, and DA3), determines a second part recording order by rearranging the divided data DA5 to DA8 of the fourth group GP4 into an ascending order of LBAs (hereinafter, referred to as an LBA ascending order) (in this case, in an order of DA6, DA5, DA8, DA7).

Then the data manager 23 determines a recording order of recording the divided data DA1 to DA8 on the hard disk drive 1 so that the second part recording order comes after the first part recording order (in this case, an order of DA1, DA4, DA2, DA3, DA6, DA5, DA8, DA7).

In addition, the data manager 23 similarly determines a recording order for each of the following data DB, . . . .

In this case, as shown in FIG. 8D, the recording positions of the first divided data D1 to the divided data D6 are sequentially arranged from the outer circumference side toward the inner circumference side, and the recording positions of the divided data D6 to the last divided data D7 are sequentially arranged from the inner circumference side toward the outer circumference side.

Therefore, the hard disk drive 1 is capable of reducing a total seek distance of the head unit 5 to record all the divided data DA1 to DA8 of the data DA, at least to one-round in the radial direction of the disk 4. That is, total seek time can be reduced as well, thus making it possible to significantly increase a possibility of recording all the divided data DA1 to DA8 within the time slot TS.

In addition, since the last divided data D7 of the data DA and the first divided data DB1 of the next data DB are both to be recorded on the outer circumference side, a seek distance L4 and also seek time T4 can be shortened. Comparing to a case of FIG. 6, the divided data of not only the data DA but also the continuous data DA and DB are stored at sequential LBAs. This significantly decreases a possibility of long track seeking operation, resulting in decreasing a possibility of retry for the track seeking operation. As a result, total seek time can be reduced, which can significantly increase a possibility of recording all the divided data of the data DB within the time slot TS.

Then the data manager 23 sends the divided data DA1 to DA8 of the data DA and the data DB, DC, . . . to the RAID units in their recording orders.

As described above, the data manager 23 determines the recording order of each of the data DA, DB, DC, . . . , and continuously records the divided data on the hard disk drive 1 in the corresponding recording orders, thus making it possible to continuously record the data DA, DB, DC, . . . , that is, to continuously record the AV data D1.

(1-6) Data Recording Procedure of Data Manager 23

Figure 11:
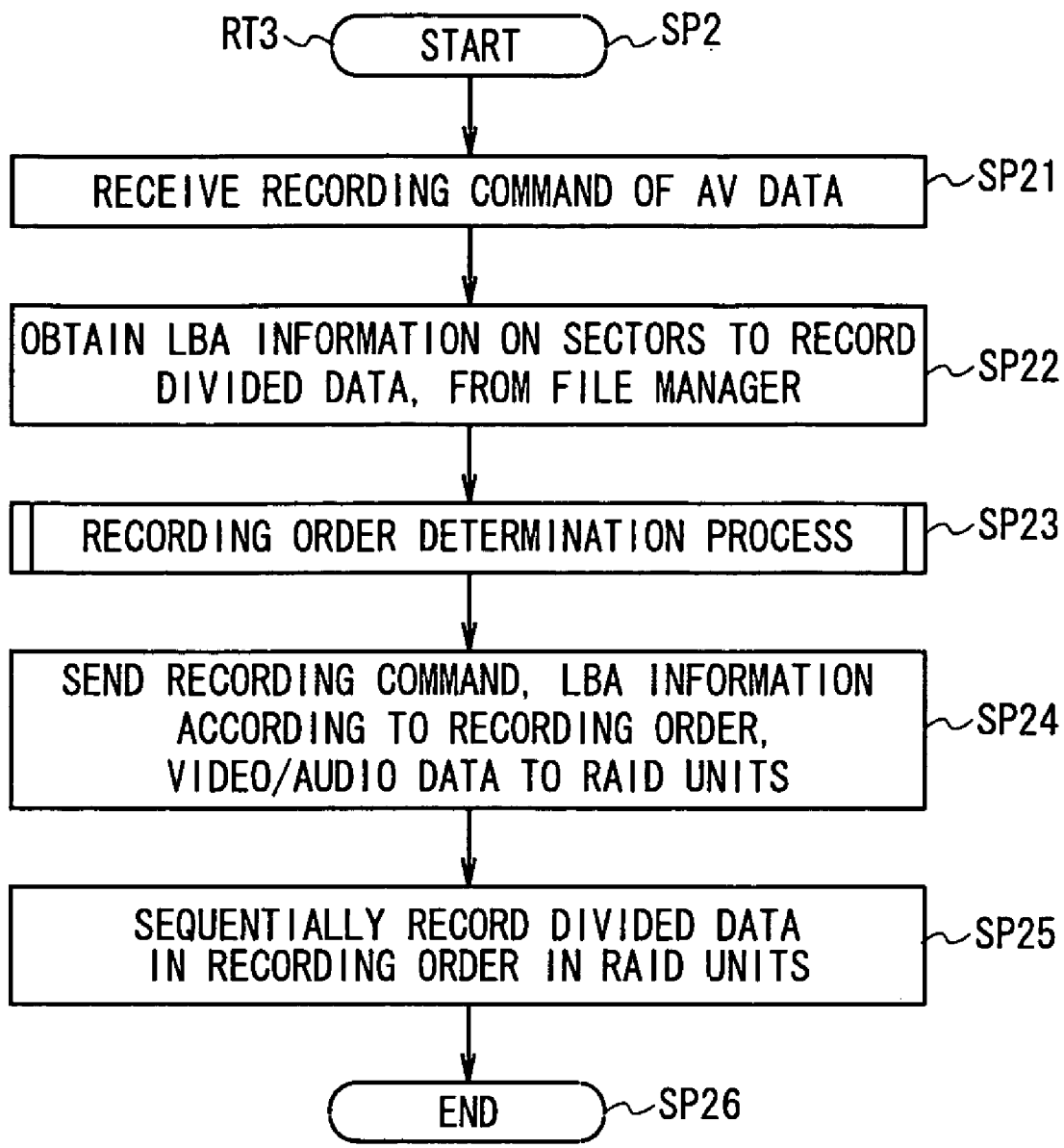
FIG. 11 is a flowchart showing a data recording procedure.

When a data manager 23 of the video server system 1 receives a recording command C1A of AV data from the CPU 20, it records the data by specifying LBAs in the hard disk drive 1 with a data recording procedure RT3 shown in FIG. 11.

The data manger 23 starts the data recording procedure RT3 from step SP20 under the control of the CPU 20. When the data manager 23 confirms the reception of the recording command C1A from the CPU 20 (FIG. 7) at step SP21, it goes on to step SP22 to obtain the LBA information on the divided data of the file to store the AV data D1 indicated by the recording command C1A.

Then the data manager 23 goes on to step SP24 to send the video recording command C2 (audio recording command C3) and the LBA information of the divided data in the recording order, and the video data D2 (audio data D3) to the video RAID unit 12 (audio RAID unit 13).

At this time, the video RAID unit 12 and the audio RAID unit 13 record the video data D2 and the audio data D3 in the form of divided data based on the LBA information on the hard disk drive 1, according to the video recording command C2 and the audio recording command C3 from the data manager 23 at step SP25.

Then the data manager 23 goes on to step SP26 where this data recording procedure RT3 is completed.

As described above, the data manager 23 sequentially records the divided data composing the video data D2 (audio data D3) on the hard disk drive 1 in the recording order.

(1-7) Recording Order Determination Procedure According to the First Embodiment

Figure 12:
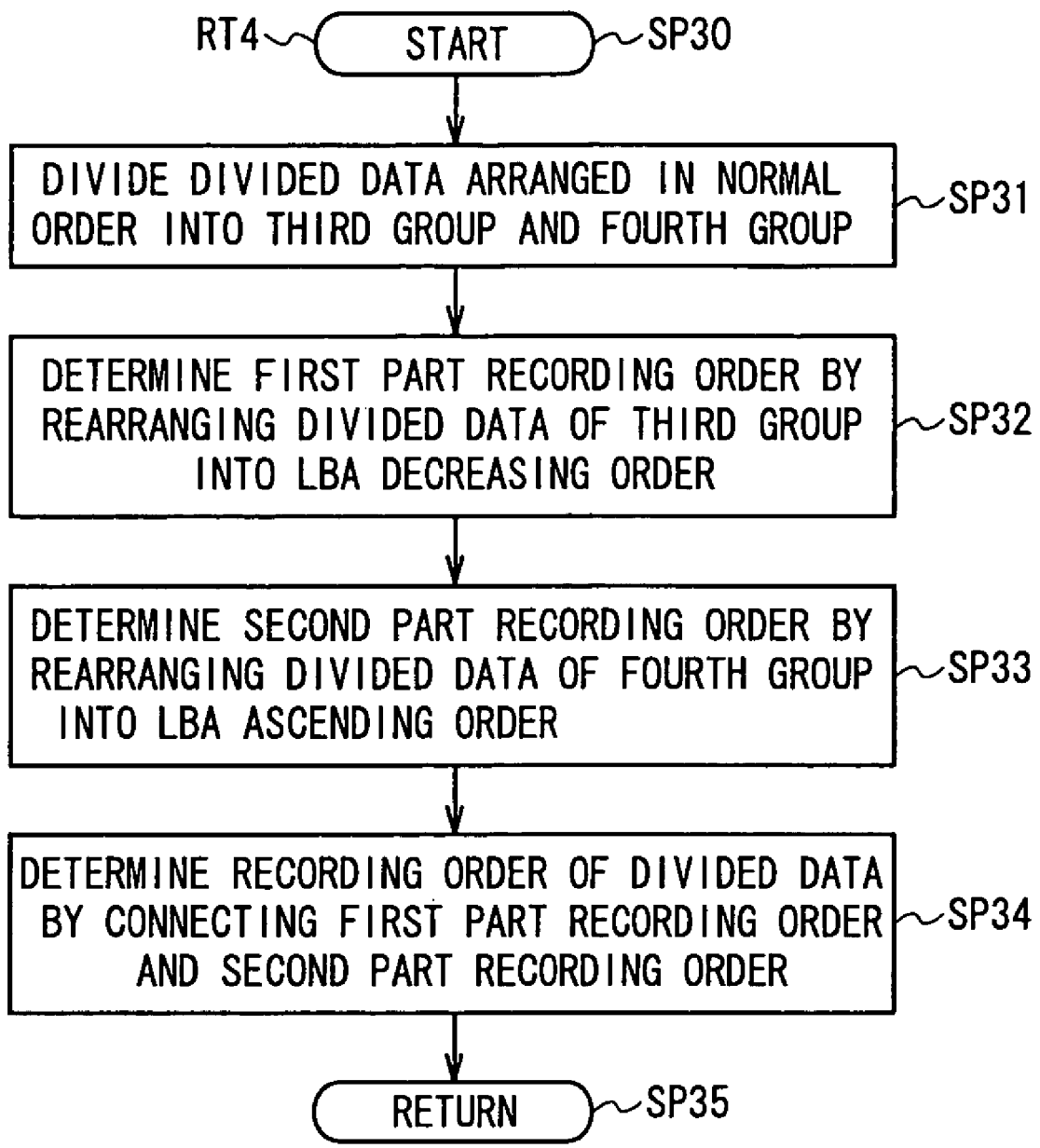
FIG. 12 is a flowchart showing a recording order determination procedure according to the first embodiment.

The recording order determination process of the data manager 23 of the above step SP23 will be now described with a recording order determination procedure RT4 shown in FIG. 12.

When the data manger 23 obtains the LBA information for the divided data of a file to store the AV data D1, it starts the recording order determination procedure RT4 from step SP30. At step SP31, the data manager 23 divides the divided data DA1 to DA8 of the data DA arranged in the normal order, into a first group GP1 and a second group GP2 (FIG. 8B).

The data manager 23 goes on to step SP32 to determine a first part recording order by rearranging the divided data of the first group GP1 into an LBA decreasing order and goes on to step SP33 to determine a second part recording order by rearranging the divided data of the second group GP2 into an LBA ascending order (FIG. 8C).

Then the data manager 23 goes on to step SP34 to determine a recording order so that the second part recording order comes after the first part recording order. The data manager 23 goes on to step SP34 where this recording order determination procedure RT4 is completed.

As described above, the data manager 23 determines the recording order based on the LBA information of the divided data.

(1-8) Operation and Effects of this Embodiment

According to the above configuration, when a data manager 23 of the video server system 10 receives a reproduction command C6A of AV data D5 from the CPU 20, it obtains the LBA information on the divided data DA1 to DA8 of the data DA to be read, from the file manager 21, divides the divided data DA to DA8 of the data DA arranged in a reproduction order, into a first group GP1 and a second group GP2, determines a first part readout order by rearranging the first group GP1 into an LBA decreasing order and a second part readout order by rearranging the second group GP2 into an LBA ascending order, determines a readout order so that the second part readout order comes after the first part readout order (FIG. 8C), obtains the divided data DA1 to DA8 from the hard disk drives 1 of the video RAID unit 12 (audio RAID unit 13) in the readout order, rearranges the divided data DA1 to DA8 arranged in the readout order into the reproduction order, and sends them to the audio-visual encoding/decoding processor 24, thus outputting the AV data D5.

In the readout order of the divided data DA1 to DA8 of the data DA, the storage positions of the first divided data DA1 to the divided data D6 are sequentially arranged from the outer circumference side toward the inner circumference side of the disk and the storage positions of the divided data D6 to the last divided data 7 are sequentially arranged from the inner circumference side toward the outer circumference side of the disk (FIG. 8D), the divided data D6 being stored on the most inner circumference. Therefore, when the divided data DA1 to DA8 and the next divided data DB1 are read in the readout order, the data manager 23 is able to reduce a total seek distance of the head unit 5 of the hard disk drive 1 at least to one-round in the radial direction, and thus the number of times of retry is reduced as well, resulting in reducing total seek time. This significantly increases a possibility of reading all the divided data DA1 to DA8 of the data DA within the time slot TS and significantly increases a possibility of reading all the divided data of following data DB, DC, . . . within corresponding time slots TS.

Further, when the data manager 23 of the video server system 10 receives a recording command C1A of AV data D1 from the CPU 20, it obtains the LBA information for the divided data DA1 to DA8 of the data DA to be recorded, from the file manager 21, divides the divided data DA1 to DA8 of the data DA arranged in the normal order, into a third group GP3 and a fourth group GP4, determines a first part recording order by rearranging the third group GP3 into an LBA decreasing order and a second part recording order by rearranging the fourth group GP4 into an LBA ascending order, determines a recording order so that the second part recording order comes after the first part recording order (FIG. 8C), and records the divided data DA1 to DA8 on the hard disk drive 1 of the video RAID unit 12 (audio RAID unit 13) in the recording order.

In the recording order of the divided data DA1 to DA8 of the data DA, the recording positions of the first divided data DA1 to the divided data DA6 are arranged from the outer circumference side toward the inner circumference side of the disk and the recording positions of the divided data DA6 to the last divided data DA7 are arranged from the inner circumference side toward the outer circumference side, the divided data DA6 to be recorded on the most inner circumference side (FIG. 8D). Therefore, for continuously recording the divided data DA1 to DA8 and the next divided data DB1 in the recording order, the data manager 23 is capable of reducing a total seek distance of the head unit 5 of the hard disk drive 1, at least to one-round in the radial direction, and reducing the number of times of retry as well, resulting in reducing total seek time. This can increase a possibility of recording all the divided data DA1 to DA8 of the data DA within the time slot TS and significantly increase a possibility of recording all the divided data of following data DB, DC, . . . within corresponding time slots TS.

Furthermore, the data manager 23 is capable of easily determining a readout order (recording order) of the divided data DA1 to DA8 from a reproduction order (normal order) by combining processes including division into two groups, rearrangement to an ascending order or a decreasing order within each group, and connection of groups, without a large increase in processing loads of the data manager 23.

According to the above configuration, the data manager 23 divides the divided data DA1 to DA8 of the data DA arranged in the reproduction order, into a first group GP1 and a second group GP2, determines a readout order by rearranging the divided data of the first group GP1 into an LBA decreasing order and the divided data of the second group GP2 into an LBA ascending order. Therefore, for reading the divided data DA1 to DA8 and the divided data DB1 of the following data DB in the readout order, a seek distance of the head unit 5 of the hard disk drive 1 can be shortened as much as possible and the number of times of long track seeking operation can be reduced, resulting in reducing seek time. This can significantly increase reproduction efficiency to read and reproduce a plurality of data continuously.

Furthermore, the data manager 23 divides the divided data DA1 to DA8 of the data DA arranged in the normal order, into a third group GP3 and a fourth group GP4, and determines a recording order by rearranging the divided data of the third group into an LBA decreasing order and the divided data of the fourth group into an LBA ascending order. Therefore, for recording the divided data DA1 to DA8 and the divided data DB1 of the following data DB in the recording order, a seek distance of the head unit 5 of the hard disk drive 1 can be shortened as much as possible and the number of times of long track seeking operation can be reduced, resulting in reducing seek time. This can significantly improving recording efficiency to record a plurality of data continuously.

(2) Second Embodiment

FIG. 13 shows a readout order and recording order of divided data according to the second embodiment. As compared with the first embodiment (FIG. 8), the second embodiment has the same configuration, except for how to decide a readout order and a recording order.

Figure 13A:
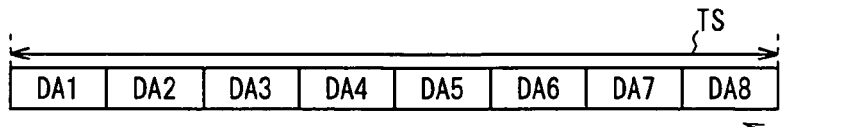
FIG. 13A to 13D are schematic diagrams explaining divided data readout order and recording order according to a second embodiment.

As to a readout order of divided data, similarly to FIG. 8A, the data DA shown in FIG. 13A is divided into divided data DA1 to DA8 and its reproduction order is an order of DA1, DA2, . . . , DA8.

Figure 13B:
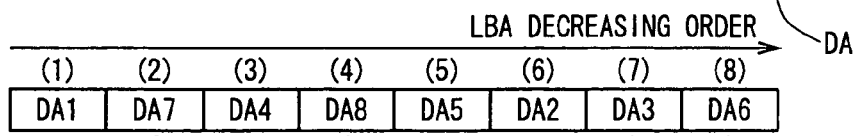

As shown in FIG. 13B, the data manager 23 first determines as a positional order such an order that the divided data DA1 to DA8 are arranged in an LBA decreasing order.

Figure 13C:
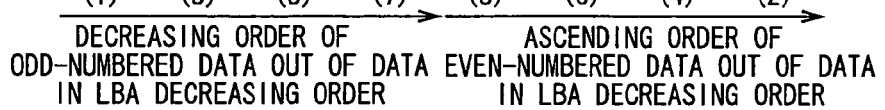

Then, as shown in FIG. 13C, the data manager 23 determines a third part readout order by rearranging odd-numbered divided data arranged in the positional order, into a decreasing order (in this case, in an order of 1st, 3rd, 5th, 7th), and a fourth part readout order by rearranging even-numbered divided data arranged in the positional order, into an ascending order (in this case, in an order of 8th, 6th, 4th, 2nd).

Then the data manager 23 determines a readout order so that the fourth part readout order comes after the third part readout order.

The data manager 23 also determines a readout order of the divided data for each of following data DB, DC, . . . in the same way.

Figure 13D:
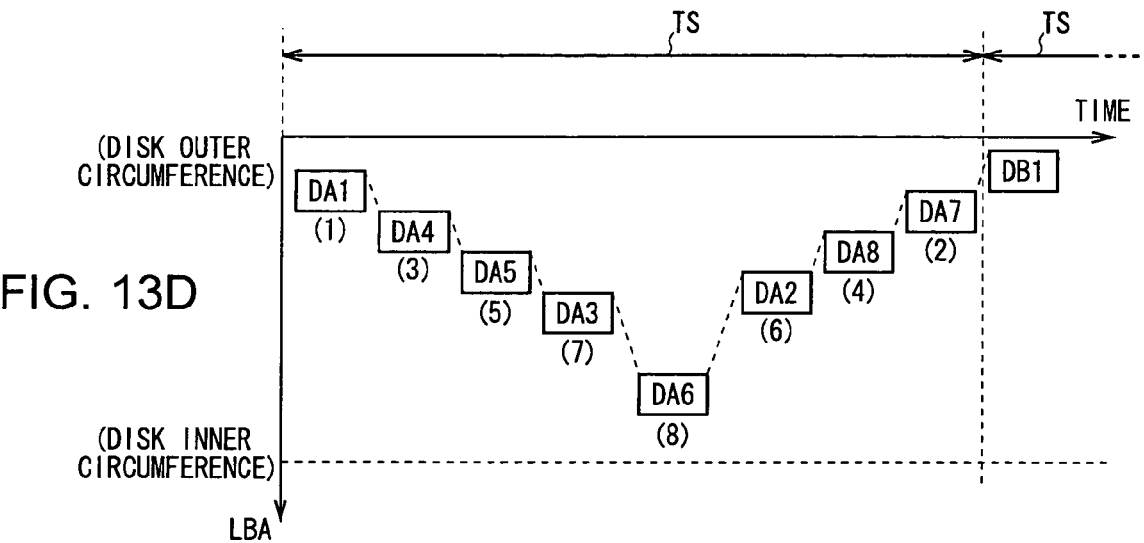

Similarly to the first embodiment, as shown in FIG. 13D, in the divided data DA1 to DA8 in the readout order, the storage positions of the first divided data DA1 to the divided data DA6 are sequentially arranged from the outer circumference side toward the inner circumference side of the disk and the storage positions of the divided data DA6 to the last divided data DA7 are sequentially arranged from the inner circumference side toward the outer circumference side of the disk, the divided data DA6 being stored on the most inner circumference side.

Therefore, similarly to the first embodiment, the hard disk drive 1 is capable of significantly increasing a possibility of reading all the divided data DA1 to DA8 of the data DA and the divided data of the following data DB . . . within corresponding time slots TS.

Then, similarly to the first embodiment, the data manager 23 sequentially reads the data DA, DB, DC, . . . in corresponding readout orders, rearranges the divided data DA1 to DA8, . . . arranged in the readout orders, into their reproduction orders, and sends them as the data DA, DB, DC, . . . to the audio-visual encoding/decoding processor 24 (FIG. 7).

As described above, the data manager 23 is capable of continuously outputting AV data D5 via the audio-visual encoding/decoding processor 24, similarly to the first embodiment.

Figure 14:
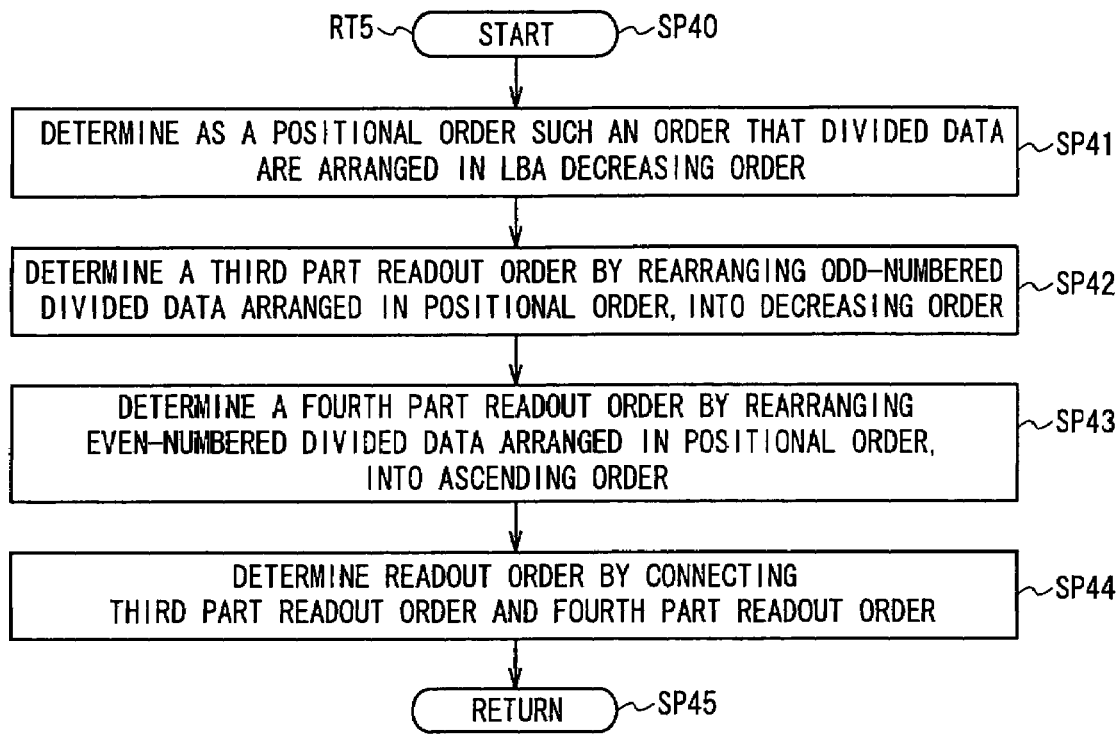
FIG. 14 is a flowchart showing a readout order determination procedure according to the second embodiment.

The data manager 23 of the video server system 1 reads data by specifying LBAs of the data on the hard disk drive 1 with the data readout procedure RT1 (FIG. 9) as in the case of the first embodiment. In the second embodiment, however, the data manager 23 determines a readout order with a readout order determination procedure RT5 shown in FIG. 14, instead of the readout order determination process of step SP3.

When the data manager 23 obtains the LBA information on the divided data of a file corresponding to the AV data D5, it starts this readout order determination procedure RT5 from step SP40. At step SP41, it determines as a positional order such an order that the divided data (FIG. 13A) in the reproduction order are rearranged into an LBA decreasing order (FIG. 13B).

Next the data manager 23 goes on to step SP42 to determine a third part readout order by rearranging the odd-numbered divided data arranged in the positional order, into a decreasing order. Then the data manager 23 goes on to step SP43 to determine a fourth part readout order by rearranging the even-numbered divided data arranged in the positional order, into an ascending order (FIG. 13C).

Then the data manager 23 goes on to step SP44 to determine a readout order so that the fourth part readout order comes after the third part readout order, and then goes on to step SP45 in which this readout order determination procedure RT5 is completed.

As described above, the data manger 23 determines the readout order based on the LBAs of the divided data.

As to the recording order of divided data, similarly to the above-described readout order of divided data, the data DA shown in FIG. 13A is divided into divided data DA1 to DA8 and the normal order is an order of DA, DA2, . . . , DA8.

The data manager 23 first determines as a positional order such an order that the divided data DA1 to DA8 in the normal order are rearranged into a decreasing order, as shown in FIG. 13B.

Then the data manager 23 determines a third part recording order by rearranging the odd-numbered divided data arranged in the positional order, into an decreasing order (in this case, an order of 1st, 3rd, 5th, 7th), and determines a fourth part recording order by rearranging the even-numbered divided data arranged in the positional order, into an ascending order (in this case, an order of 8th, 6th, 4th, 2nd), as shown in FIG. 13C.

Then the data manager 23 determines a recording order so that the fourth part recording order comes after the third part recording order.

In addition, the data manager 23 determines a recording order of divided data for each of following data DB, DC, . . . in the same way.

At this time, in the divided data DA1 to DA8 in the recording order, similarly to a case of the readout order, the recording positions of the first divided data DA1 to the divided data DA6 are sequentially arranged from the outer circumference side toward the inner circumference side of the disk and the recording positions of the divided data DA6 to the last divided data DA7 are sequentially arranged from the inner circumference side toward the outer circumference side of the disk, the divided data DA6 to be recorded on the most inner circumference side (FIG. 13D).

Therefore, the hard disk drive 1 is capable of significantly increasing a possibility of recording all the divided data DA1 to DA8 of the data DA and the divided data of the following data DB, DC, . . . within corresponding time slots TS, as in the case of the first embodiment.

Further, similarly to the first embodiment, the data manager 23 is capable of recording the data DA and the following data DB, DC, . . . on the hard disk drive 1 in the corresponding recording orders, thus making it possible to record the AV data D1 continuously.

Figure 15:
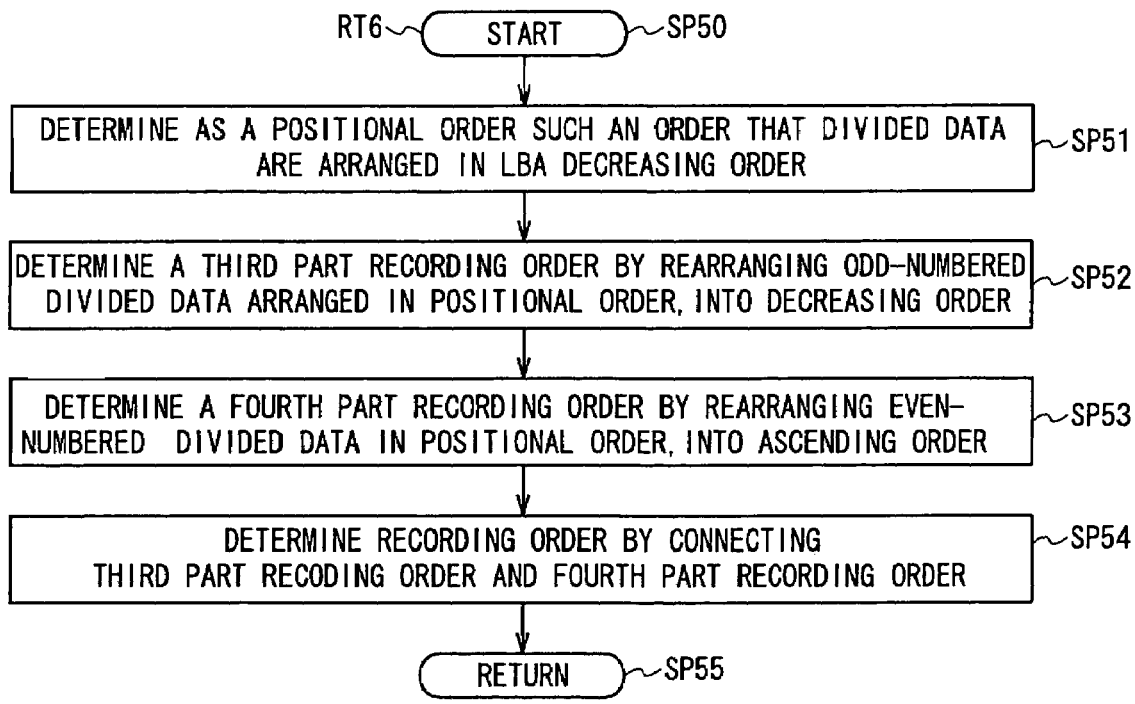
FIG. 15 is a flowchart showing a recording order determination procedure according to the second embodiment.

The data manager 23 of the video server system 1 records data by specifying LBAs in the hard disk drive 1 with the data recording procedure RT3 (FIG. 11) as in the case of the first embodiment. In the second embodiment, however, the data manager 23 determines a recording order with a recording order determination procedure RT6 shown in FIG. 15, instead of the recording order determination process of step SP23.

When the data manager 23 obtains the LBA information for the divided data of the file to store the AV data D1, it starts this recording order determination procedure RT6 from step SP50. At step SP51, the data manager 23 determines as a positional order such an order that the divided data (FIG. 13A) in the normal order are rearranged into an LBA decreasing order (FIG. 13B).

Then the data manager 23 goes on to step SP52 to determine a third part recording order by rearranging the odd-numbered divided data arranged in the positional order, into a decreasing order, and goes on to step SP53 to determine a fourth part recording order by rearranging the even-numbered divided data arranged in the positional order, into an ascending order (FIG. 13C).

Then the data manager 23 goes on to step SP54 to determine a recording order so that the fourth part recording order comes after the third part recording order, and moves on to step SP55 where this recording order determination procedure RT6 is completed.

As described above the data manager 23 determines the recording order based on the LBAs of the divided data.

According to the above configuration, when the data manager 23 of the video server system 10 receives a reproduction command C6A of AV data D5 from the CPU 20, it obtains the LBA information of the divided data DA1 to DA8 of the data DA to be read, from the file manager 21, determines as a positional order such an order that the divided data DA1 to DA8 of the data DA are arranged in the LBA decreasing order (FIG. 13B), determines a third part readout order by rearranging the odd-numbered divided data arranged in the positional order, into the decreasing order, determines a fourth part readout order by rearranging the even-numbered divided data arranged in the positional order, into the ascending order (FIG. 13C), determines a readout order so that the fourth part readout order comes after the third part readout order, and then as in the case of the first embodiment, obtains the divided data DA1 to DA8 in the readout order and rearranges the divided data DA1 to DA8 arranged in the readout order, into the reproduction order.

Therefore, similarly to the first embodiment, the data manager 23 is capable of increasing a possibility of reading all the divided data DA1 to DA8 of the data DA within the time slot TS, and also significantly increasing a possibility of reading all the divided data of the following data DB, DC, . . . within corresponding time slots TS.

On the other hand, when the data manager 23 of the video server system 10 receives a recording command C1A of AV data D1 from the CPU 20, it obtains the LBA information for the divided data DA1 to DA8 of the data DA to be recorded, from the file manager 21, determines as a positional order such an order that the divided data DA1 to DA8 of the data DA are arranged in the LBA decreasing order (FIG. 13B), determines a third part recording order by rearranging the odd-numbered divided data arranged in the positional order, into the decreasing order, determines a fourth part recording order by rearranging the even-numbered divided data arranged in the positional order, into the ascending order (FIG. 13C), determines a recording order so that the fourth part recording order comes after the third part recording order, and then as in the case of the first embodiment, records the divided data DA1 to DA8 in the recording order.

Therefore, similarly to the first embodiment, the data manager 23 is capable of increasing a possibility of recording all the divided data DA1 to DA8 of the data DA within the time slot TS, and also significantly increasing a possibility of recording all the divided data of the following data DB, DC, . . . within corresponding time slots TS.

Further, as compared with the first embodiment (FIG. 8), the data manager 23 is capable of alternatively setting the divided data DA1 to DA8 arranged in the LBA decreasing order (that is positional order), as the divided data of the third part readout order and the divided data of the fourth part readout order. Therefore, such a readout order (recording order) that all seek distances between divided data are more equal can be determined, thereby further reducing the number of times of long track seeking operation.

According to the above configuration, the data manager 23 determines as a positional order such an order that the divided data DA1 to DA8 of the data DA in the reproduction order are arranged in the LBA decreasing order, determines a third part readout order by rearranging the odd-numbered divided data arranged in the positional order, into the decreasing order, determines a fourth part readout order by rearranging the even-numbered divided data arranged in the positional order, into the ascending order, and determines a readout order so that the fourth part recording order comes after the third part recording order. Therefore, for continuously reading the divided data DA1 to DA8 and the next divided data DB1 in the readout order, a seek distance of the head unit 5 of the hard disk drive 1 can be significantly shortened, resulting in reducing seek time. This can significantly increase a possibility of reading all the data DA and following data DB, DC, . . . within corresponding time slots TS.

Further, the data manager 23 determines as a positional order such an order that the divided data DA1 to DA8 of the data DA arranged in the normal order are arranged in an LBA decreasing order, determines a third part recording order by rearranging the odd-numbered divided data arranged in the positional order, into the decreasing order, determines a fourth part recording order by rearranging even-numbered divided data arranged in the positional order, into the ascending order, and determines a recording order so that the fourth part recording order comes after the third part recording order. Therefore, for continuously recording the divided data DA1 to DA8 and the next divided data DB1 in the recording order, a seek distance of the head unit 5 of the hard disk drive 1 can be significantly shortened, resulting in reducing seek time. This can increase a possibility of recording all the data DA and the following data DB, . . . within corresponding time slots TS.

(3) Third Embodiment

FIG. 16 shows a readout order and recording order of divided data according to the third embodiment. This third embodiment has the same configuration as the first embodiment (FIG. 8), except for how to decide a readout order and a recording order.

Figure 16A:
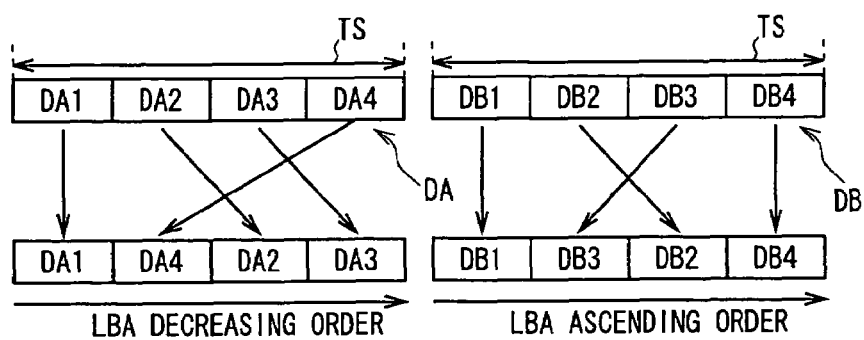

As to a readout order of divided data, as shown in FIG. 16A, the continuous first and second data DA and DB are divided into the divided data DA1 to DA4 and DB1 to DB4, respectively, and their reproduction orders are in orders of DA1 to DA4 and DB1 to DB4.

As shown in FIG. 16B, the data manger 23 determines a fifth part readout order by rearranging the divided data of the first data DA arranged in the reproduction order, into an LBA decreasing order, and determines sixth part readout order by rearranging the divided data of the second data DB arranged in the reproduction order, into an LBA ascending order.

Further, the data manager 23 determines a readout order every two pieces of data for following data DC, . . . (FIG. 4C), in the same manner.

Figure 16C:
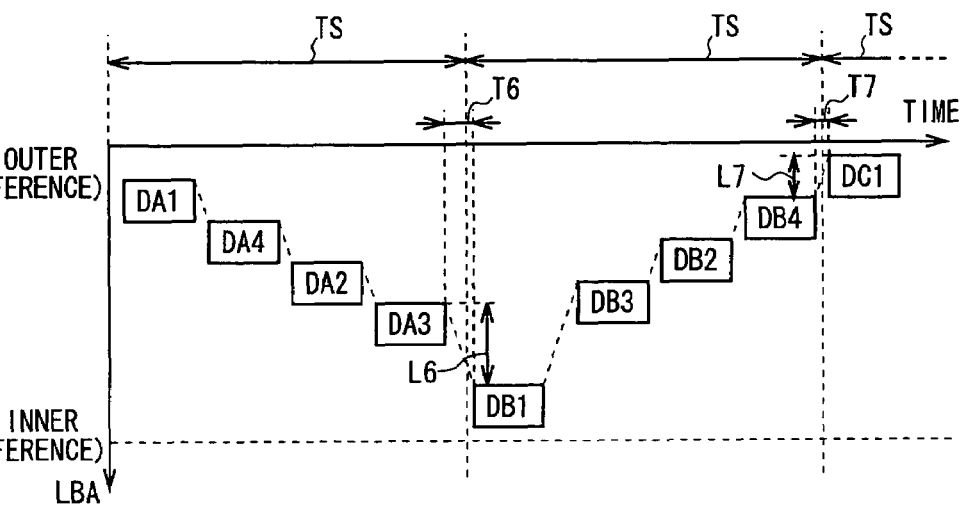

At this time, as shown in FIG. 16C, in the divided data DA1 to DA4 of the first data DA in the readout order, the storage positions of the first divided data DA1 to the last divided data DA3 are sequentially arranged from the outer circumference side toward the inner circumference side of the disk. In addition, in the divided data DB1 to DB4 of the second data DB in the readout order, the storage positions of the first divided data DB1 to the last divided data DB4 are sequentially arranged from the inner circumference side toward the outer circumference side of the disk.

Therefore, when the hard disk drive 1 continuously reads the first data DA and the second data DB (that is, divided data DA1 to DA4 and DB1 to DB4), as in the case of FIG. 6, a total seek distance of the head unit 5 within each time slot TS can be shortened at least to a one-way in the radial direction of the disk 4, resulting in reducing total seek time. This can significantly increase a possibility of reading all the divided data DA1 to DA4 and DB1 to DB4 within corresponding time slots TS.

Further, different from a case of FIG. 6, when the hard disk drive 1 reads the first divided data DB1 of the second data DB after the last divided data DA3 of the first data DA, a short seek distance L6 and short seek time T6 can be realized because the storage positions of both the data DB1 and DA3 exist on the inner circumference side of the disk. Further, when the first divided data DC1 of the data DC is read after the last divided data DB4 of the second data DB, a short seek distance L7 and short seek time T7 can be realized because the storage positions of both the divided data DC1 and DB4 exist on the outer circumference side of the disk. Therefore, as compared with a case of FIG. 6, a possibility of long track seeking operation is significantly reduced, and a possibility of retry for the seeking operation is reduced as well, thus making it possible to reduce total seek time.

Then the data manager 23 rearranges the divided data DA1 to DA4 and DB1 to DB4 and the divided data of following DC, . . . from the readout orders to the reproduction orders, and sends them the audio-visual encoding/decoding processor 24 (FIG. 7) continuously.

As described above, the data manager 23 continuously reads the continuous data DA, DB, DC, . . . from the hard disk drive 1.

Figure 17:
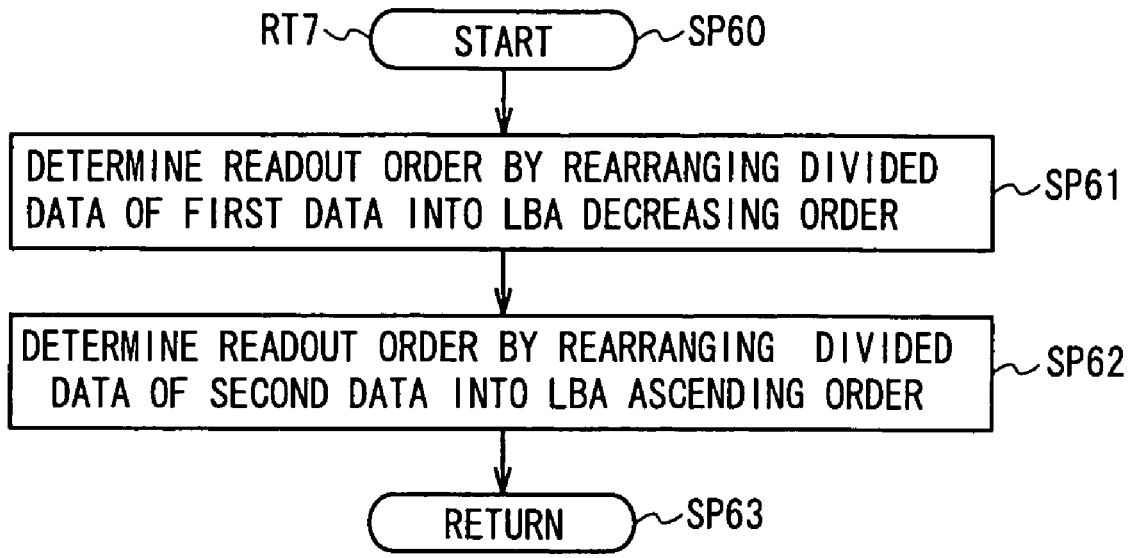
FIG. 17 is a flowchart showing a readout order determination procedure according to the third embodiment.

The data manager 23 of the video server system 1 reads data by specifying LBAs of the data on the hard disk drive 1 with the data readout procedure RT1 (FIG. 9) as in the case of the first embodiment. In this third embodiment, however, the data manager 23 determines a readout order with a readout order determination procedure RT7 shown in FIG. 17, instead of the readout order determination process of step SP3.

When the data manager 23 obtains the LBA information of the divided data of the file corresponding to the AV data D5, it starts this readout order determination procedure RT7 from step SP60. At step SP61, the data manager 23 rearranges the first data DA arranged in the reproduction order, into the LBA decreasing order and determines this order as a fifth part readout order (FIG. 16B).

Then the data manager 23 goes on to step SP62 to rearrange the second data DB arranged in the reproduction order, into the LBA ascending order and determine this order as a sixth part readout order (FIG. 16B), and then goes on to step SP63 where this readout order determination procedure RT7 is completed.

As described above, the data manager 23 determines the readout order based on the LBAs of the divided data.

As to a recording order of divided data, on the other hand, similarly to a case of the above readout order, the continuous first and second data DA and DB are divided into divided data DA1 to DA4 and DB1 to DB4, respectively, and their recording orders are orders of DA1 to DA4 and DB1 to DB4 (FIG. 16A).

As shown in FIG. 16B, the data manager 23 first rearranges the divided data of the first data DA arranged in the normal order, into the LBA decreasing order and determines this order as a fifth part recording order, and then rearranges the divided data of the second data DB arranged in the normal order, into the LBA ascending order and determines this order as a sixth part recording order.

In addition, the data manager 23 determines recording orders for every two pieces of data for following data DC, . . . (FIG. 4C), in the same manner.

At this time, as show in FIG. 16C, in the divided data DA1 to DA4 of the first data DA in the recording order, the recording positions of the first divided data DA1 to the last divided data DA3 are sequentially arranged from the outer circumference side toward the inner circumference side of the disk. And in the divided data DB1 to DB4 of the second data DB in the recording order, the recording positions of the first divided data DB1 to the last divided data DB4 are sequentially arranged from the inner circumference side toward the outer circumference side of the disk.

Therefore, when the hard disk drive 1 continuously records the first data DA and the second data DB (that is, divided data DA1 to DA4, DB1 to DB4), as in the case of FIG. 6, a total seek distance of the head unit 5 within each time slot TS can be shortened at least to a one-way in the radial direction of the disk 4 and therefore, total seek time can be reduced, thus making it possible to significantly increasing a possibility of recording all the divided data DA1 to DA4 and DB1 to DB4 within corresponding time slots TS.

Further, different from the case of FIG. 6, when the hard disk drive 1 records the first divided data DB1 of the second data DB after the last divided data DA3 of the first data DA, a short seek distance L6 and short seek time T6 can be realized because both the divided data DA3 and DB1 are to be recorded on the inner circumference side of the disk. Furthermore, when the first divided data DC1 of the data DC is recorded after the last divided data DB4 of the second data DB, a short seek distance L7 and short seek time T7 can be realized because both the divided data DC1 and DB4 are to be recorded on the outer circumference side of the disk. Therefore, especially, as compared with the case of FIG. 6, a possibility of long track seeking operation is significantly reduced and a possibility of retry for the seeking operation is reduced as well, resulting reducing total seek time.

Then the data manager 23 sequentially records the divided data DA1 to DB4 and the divided data of the following data DC, . . . , on the hard disk drive 1.

Figure 18:
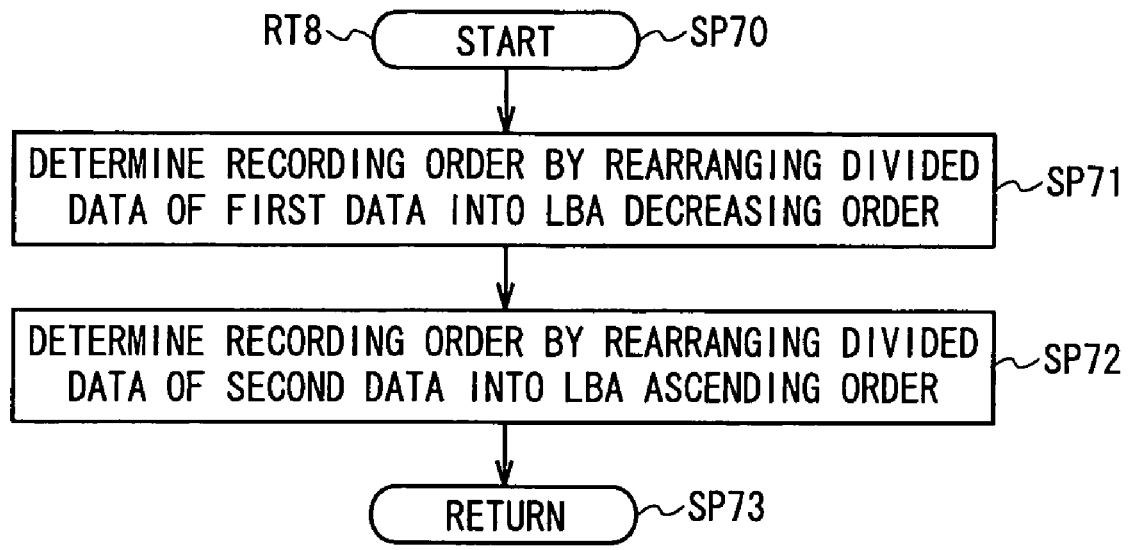
FIG. 18 is a flowchart showing a recording order determination procedure according to the third embodiment.

The data manager 23 of the video server system 1 records data by specifying LBAs in the hard disk drive 1 with the data recording procedure RT3 (FIG. 11) as in the case of the first embodiment. In the third embodiment, however, the data manager 23 determines a recording order with a recording order determination procedure RT8 shown in FIG. 18, instead of the recording order determination process of step SP23.

When the data manager 23 obtains the LBA information for the divided data of a file to store the AV data D1, it starts this recording order determination procedure RT8 from step SP70. At step SP71, the data manager 23 rearranges the first data DA arranged in the normal order, into the LBA decreasing order, and determines this order as a fifth part recording order (FIG. 16B).

Next the data manager 23 goes on to step SP72 to rearrange the second data DB arranged in the normal order, into the LBA ascending order, determines this order as the sixth part recording order (FIG. 16B), and goes on to step SP73 where this recording order determination procedure RT8 is completed.

As described above, the data manager 23 determines the recording order based on the LBAs of the divided data.

According to the above configuration, similarly to the first embodiment, when the data manager 23 of the video server system 10 receives a reproduction command C6A of AV data D5 from the CPU 20, it obtains the LBA information on the divided data DA1 to DA4 of the first data DA and the divided data DB1 to DB4 of the second data DB to be read, from the file manager 21, determines a fifth part readout order by rearranging the divided data DA1 to DA4 of the first data DA arranged in the reproduction order, into the LBA decreasing order, determines a sixth part readout order by rearranging the divided data DB1 to DB4 of the second data DB arranged in the reproduction order, into the LBA ascending order (FIG. 16B), reads the divided data DA1 to DA4, DB1 to DB4 in their readout orders, and rearranges the divided data DA1 to DA4, DB1 to DB4 arranged in the readout orders, into the corresponding reproduction orders.

Therefore, in the divided data DA1 to DA4 of the first data DA in the readout order, the storage positions of the first divided data DA1 to the last divided data DA3 are sequentially arranged from the outer circumference side toward the inner circumference side of the disk. In the divided data DB1 to DB4 of the second data DB in the readout order, the storage positions of the first divided data DB1 to the last divided data DB4 are sequentially arranged from the inner circumference side toward the inner circumference side of the disk (FIG. 16C). Therefore, in a case of reading the first data DA and second data DB (that is, the divided data DA1 to DA4, DB1 to DB4), a total seek distance of the head unit 5 within each time slot TS can be shortened at least to one-way in the radial direction of the disk 4. Further, the storage positions of the last divided data DA3 of the first data DA and the first divided data DB1 of the second data DB are both on the inner circumference side of the disk. Furthermore, the storage positions of the last divided data DB4 of the second data DB and the first divided data DC1 of the third data DC are both on the outer circumference side of the disk. This shortens a seek distance and seek time of the head unit 5 between their time slots TS, thus making it possible to significantly increase a possibility of reading all the divided data DA1 to DA4, DB1 to DB4 within corresponding time slots TS.

Further, similarly to the first embodiment, when the data manager 23 of the video server system 10 receives a recording command C1A of AV data D1 from the CPU 20, it obtains the LBA information for a file to store the divided data DA1 to DA4 of the first data DA and the divided data DB1 to DB4 of the second data DB, from the file manager 21, determines a fifth part recording order by rearranging the divided data DA1 to DA4 of the first data DA arranged in the normal order, into the LBA decreasing order, determines a sixth part recording order by rearranging the divided data DB1 to DB4 of the second data DB arranged in the normal order, into the LBA ascending order (FIG. 16B), and records the divided data DA1 to DA4 and DB1 to DB4 on the hard disk drive 1 in their recording orders.

Therefore, in the divided data DA1 to DA4 of the first data DA in the recording order, the recording positions of the first divided data DA1 to the last divided data D3 are sequentially arranged from the outer circumference side toward the inner circumference side of the disk. In the divided data DB1 to DB4 of the second data DB in the recording order, the recording positions of the first divided data DB1 to the last divided data DB4 are sequentially arranged from the inner circumference side toward the outer circumference side of the disk (FIG. 16C). This shortens a total seek distance of the head unit 5 within each time slot TS at least to a one-way in the radial direction of the disk 4 when the first data DA and the second data DB (that is, divided data DA1 to DA4, DB1 to DB4) are recorded. Further, the last divided data DA3 of the first data DA and the first divided data DB1 of the second data DB are both to be recorded on the inner circumference side of the disk. Furthermore, the last divided data DB4 of the second data DB and the first divided data DC1 of the third data DC are both to be recorded on the outer circumference side of the disk. This can shorten a seek distance and seek time of the head unit 5 between their time slots TS, thus making it possible to significantly increase a possibility of recording all the divided data DA1 to DA4 and DB1 to DB4 within corresponding time slots TS.

Further, as compared with the first and second embodiments where a seek distance of the head unit 5 within one time slot TS is one-round in the radial direction of the disk at longest, the data manager 23 can shorten a seek distance to a one-way from the most inner circumference to the most outer circumference in the radial direction of the disk in the third embodiment. Therefore total seek time can be further reduced.

According to above configuration, the data manager 23 determines a fifth part readout order by rearranging the divided data DA1 to DA4 of the first data DA arranged in the reproduction order, into the LBA decreasing order, determines a sixth part readout order by rearranging the divided data DB1 to DB4 of the second data DB arranged in the reproduction order, into the LBA ascending order. This can significantly shorten a seek distance and seek time of the head unit 5 of the hard disk drive 1 when the divided data DA1 to DA4, DB1 to DB4, and the next divided data DC1 are continuously read in the corresponding readout orders, thus making it possible to significantly increase a possibility of reading all the data DA, DB and following data DC, . . . within corresponding time slots TS.

Further, the data manager 23 determines a fifth part recording order by rearranging the divided data DA1 to DA4 of the first data DA arranged in the normal order, into the LBA decreasing order, determines a sixth part recording order by rearranging the divided data DB1 to DB4 of the second data DB arranged in the normal order, into the LBA ascending order. This can significantly shorten a seek distance and seek time of the head unit 5 of the hard disk drive 1 when the divided data DA1 to DA4, DB1 to DB, and the next divided data DC1 are recorded continuously in the corresponding recording orders, thus making it possible to significantly increase a possibility of recording all the data DA, DB, DC, . . . within corresponding time slots TS.

(4) Other Embodiment

In the above-described embodiment, a readout order (recording order) of divided data is determined based on LBAs. This invention, however, is not limited to this and the numbers of tracks TR and the numbers of sectors SC can be used, provided that the positions of the divided data in the radial direction of the disk 4 of the hard disk drive 1 can be compared with each other.

Further, in the above-described embodiments, the positions of divided data on the disk in the readout order (or the recording order) are sequentially arranged in an order of "disk outer circumference side", "disk inner circumference side", and "disk outer circumference side", within one time slot (first and second embodiments) or within two continuous time slots (third embodiment). This invention, however, is not limited to this and the positions can be arranged in an order of "disk inner circumference side", "disk outer circumference side", and "disk inner circumference side", or in an order of "intermediate part between the inner and outer circumferences of disk (hereinafter, referred to disk intermediate part)", "disk outer circumference side", "disk inner circumference side", and "disk intermediate part", provided that a total seek distance of the head unit 5 within one time slot TS can be one-round or shorter in the radial direction of the disk and divided data close to each other in the radial direction of the disk can be read (or recorded) continuously over time slots TS.

Still further, in the above-described embodiments, data is divided into the first group GP1 and the second group GP2 so as to have the equal number of divided data, that is, four pieces of divided data (FIG. 8). This invention, is not limited to this and different numbers can be adopted, such as five for the first group GP1 and three for the second group GP2.

Still further, in the above-described embodiments, this invention is applied to a case of reading (or recording) data from the hard disk drive 1 of the video server system 10. This invention, however, is not limited to this and can be applied to a case of reading (or recording) data from various kinds of hard disk devices which are installed in general computers, servers, and navigation systems.

Still further, in the above-described embodiments, this invention is applied to the hard disk drive 1. This invention, however, is not limited to this and can be applied to various kinds of reproducing apparatuses and recording apparatuses for randomly accessible recording media, such as compact disc-read only memory (CD-ROM) drives and digital versatile disc (DVD) drives.

This invention can be applied to general computer hard disks other than video server systems.

While there has been described in connection with the preferred embodiments of the invention, it will be obvious to those skilled in the art that various changed and modifications may be aimed, therefore, to cover in the appended claims all such changes and modifications as fall within the true spirit ad scope of the invention.

What is claimed is:

1. A reproducing apparatus for reproducing data, which has been divided into a prescribed size, from a disk with a head moving in a radial direction of the disk rotating, in response to a reproduction command given from outside, the reproducing apparatus comprising:

readout order determination means for determining a readout order of data of the prescribed size so that all the data of the prescribed size can be reproduced continuously while the head goes and returns once in the radial direction of the disk, the data of the prescribed size composing the data specified from the outside;

head position control means for controlling a position of the head in the radial direction of the disk so as to continuously reproduce the data of the prescribed size in the readout order determined by the readout order determination means; and rearrangement means for rearranging the data of the prescribed size reproduced from the disk via the head, into a correct reproduction order based on the reproduction command.

2. The reproducing apparatus according to claim 1, wherein the readout order determination means:

determines a first part readout order so that storage positions of first to prescribed-numbered data of the prescribed size in the correct reproduction order are sequentially arranged in the radial direction of the disk from a most outer circumference side toward a most inner circumference side of the disk or from the most inner circumference side toward to the most outer circumference side of the disk, determines a second part readout order so that storage positions of next-numbered to last data of the prescribed size in the correct reproduction order are sequentially arranged in the radial direction of the disk from the most inner circumference side toward the most outer circumference side of the disk or from the most outer circumference side toward the most inner circumference side, and determines the readout order so that the second part readout order comes after the first part readout order or the first part readout order comes after the second part readout order.

3. The reproducing apparatus according to claim 1, wherein said readout order determination means:

determines a positional order so that storage positions of the data of the prescribed size are sequentially arranged in the radial direction of the disk from a most outer circumference side toward a most inner circumference side of the disk or from the most inner circumference side toward the most outer circumference side of the disk, determines a third part readout order by rearranging odd-numbered data of the prescribed size in the positional order, into in a decreasing order or an ascending order and a fourth part readout order by rearranging even-numbered data of the prescribed size in the positional order, into the ascending order or the decreasing order, and determines the readout order so that the fourth part readout order comes after the third part readout order or the third part readout order comes after the fourth part readout order.

4. The reproducing apparatus according to claim 1, wherein:

the reproduction command is a reproduction command to continuously reproduce first and second data; and the readout order determination means:

determines a fifth part readout order so that storage positions of data of the prescribed size composing the first data are sequentially arranged in the radial direction of the disk from a most outer circumference side toward a most inner circumference side of the disk or from the most inner circumference side toward the most outer circumference side of the disk, determines a sixth part readout order so that storage positions of data of the prescribed size composing the second data are sequentially arranged in the radial direction of the disk from the most inner circumference side toward the most outer circumference side of the disk or from the most outer circumference side toward the most inner circumference side of the disk, and determines the readout order so that the sixth part readout order comes after the fifth part readout order.

5. The reproducing apparatus for reproducing data according to claim 1, wherein the data includes audio data and/or video data.

6. A reproduction method of reproducing data, which has been divided into a prescribed size, from a disk with a head moving in a radial direction of the disk rotating, in response to a reproduction command given from outside, the reproduction method comprising:

a first step of determining a readout order of data of the prescribed size so that all the data of the prescribed size are continuously reproduced while the head goes and returns once in the radial direction of the disk, the data of the prescribed size composing the data specified from the outside:

a second step of controlling a position of the head in the radial direction of the disk so that the data of the prescribed size are sequentially reproduced in the readout order determined; and a third step of rearranging and outputting the data of the prescribed size reproduced from the disk via the head, into a correct reproduction order based on the reproduction command wherein, in the first step, a first part readout order is determined so that storage positions of first to prescribed-numbered data of the prescribed size in the correct reproduction order are sequentially arranged in the radial direction of the disk from a most outer circumference side toward to a most inner circumference side of the disk or from the most inner circumference side toward to the most outer circumference side of the disk, a second part readout order is determined so that storage positions of next-numbered to last data of the prescribed size in the correct reproduction order are sequentially arranged in the radial direction of the disk from the most inner circumference side toward the most outer circumference side of the disk or from the most outer circumference side toward the most inner circumference side of the disk, and the readout order is determined so that the second part readout order comes after the first part readout order or the first part readout order comes after the second part readout order.

7. A reproduction method of reproducing data, which has been divided into a prescribed size, from a disk with a head moving in a radial direction of the disk rotating, in response to a reproduction command given from outside, the reproduction method comprising:

a first step of determining a readout order of data the prescribed size so that all the data of the prescribed size are continuously reproduced while the head goes and returns once in the radial direction of the disk, the data of the prescribed size composing the data specified from the outside;

a second step of controlling a position of the head in the radial direction of the disk so that the data of the prescribed size are sequentially reproduced in the readout order determined; and a third step of rearranging and outputting the data of the prescribed size reproduced from the disk via the head, into a correct reproduction order based on the reproduction command wherein, in the first step, a positional order is determined so that storage positions of the data of the prescribed size are sequentially arranged in the radial direction of the disk from a most outer circumference side toward a most inner circumference side of the disk or from the most inner circumference side toward the most outer circumference side of the disk, a third part readout order is determined so that odd-numbered data of the prescribed size in the positional order are sequentially rearranged in a decreasing order or an ascending order, a fourth part readout order is determined so that even-numbered data of the prescribed size in the positional order are sequentially rearranged in the ascending order or the decreasing order, and the readout order is determined so that the fourth part readout order comes after the third part readout order or the third part readout order comes after the fourth part readout order.

8. A reproduction method producing data, which has been divided into a prescribed size, from a disk with a head moving in a radial direction of the disk rotating, in response to a reproduction command given from outside, the reproduction method comprising:

a first step of determining a readout order of data of the prescribed size so that all the data of the prescribed size are continuously reproduced while the head goes and returns once in the radial direction of the disk, the data of the prescribed size composing the data specified from the outside;

a second step of controlling a position of the head in the radial direction of the disk so that the data of the prescribed size are sequentially reproduced in the readout order determined; and a third step of rearranging and outputting the data of the prescribed size reproduced from the disk via the head, into a correct reproduction order based on the reproduction command wherein:

the reproduction command is a reproduction command to reproduce first and second data continuously; and, in the first step, a fifth part readout order is determined so that storage positions of data of the prescribed size composing the first data are sequentially arranged in the radial direction of the disk from a most outer circumference side toward a most inner circumference side of the disk or from the most inner circumference side toward to the most outer circumference side of the disk, a sixth part readout order is determined so that storage positions of data of the prescribed size composing the second data are sequentially arranged in the radial direction of the disk from the most inner circumference side toward the most outer circumference side of the disk or from the most outer circumference side toward the most inner circumference side of the disk, and the readout order is determined so that the sixth part readout order comes after the fifth part readout order.

9. A recording apparatus for dividing data given from outside into a prescribed size and recording the data on a disk with a head moving in a radial direction of the disk rotating, in response to a recording command given from the outside, the recording apparatus comprising:

recording order determination means for determining a recording order of data of the prescribed size so that all the data of the prescribed size is recorded continuously while the head goes and returns once in the radial direction of the disk; and head position control means for controlling a position of the head in the radial direction of the disk so as to continuously record the data of the prescribed size in the recording order.

10. The recording apparatus according to claim 9, wherein the recording order determination means:

determines a first part recording order so that first to pre-scribed-numbered data of the prescribed size are sequentially positioned in the radial direction of the disk from a most outer circumference side toward a most inner circumference size of the disk or from the most inner circumference side toward the most outer circumference side of the disk, determines a second part recording order so that next-numbered to last data of the prescribed size are sequentially positioned in the radial direction of the disk from the most inner circumference side toward the most outer circumference side of the disk or from the most outer circumference side toward the most inner circumference side of the disk, and determines the recording order so that the second part recording order comes after the first part recording order or the first part recording order comes after the second part recording order.

11. The recording apparatus according to claim 9, wherein the recording order determination means:

determines a positional order so that data of the prescribed size are sequentially positioned in the radial direction of the disk from a most outer circumference side toward a most inner circumference side of the disk or from the most inner circumference side toward the most outer circumference side of the disk, determines a third part recording order by rearranging odd-numbered data of the prescribed size arranged in the positional order, into a decreasing order or an ascending order, determines a fourth part recording order by rearranging even-numbered data of the prescribed size arranged in the positional order, into the ascending order or the decreasing order, and determines the recording order so that the fourth part recording order comes after the third part recording order or the third part recording order comes after the fourth part recording order.

12. The recording apparatus according to claim 9, wherein:

the recording command is a recording command to record first and second data continuously; and the recording order determination means:

determines a fifth part recording order so that data of the prescribed size composing the first data are sequentially positioned in the radial direction of the disk from a most outer circumference side toward a most inner circumference side of the disk or from the most inner circumference side toward the most outer circumference side of the disk, determines a sixth part recording order so that data of the prescribed size composing the second data are sequentially positioned in the radial direction of the disk from the most inner circumference side toward the most outer circumference side or from the most outer circumference side toward the most inner circumference side, and determines the recording order so that the sixth part recording order comes after the fifth part recording order.

13. A recording method of dividing data given from outside and recording the data on a disk with a head moving in a radial direction of the disk rotating, in response to a recording command given from the outside, said recording method comprising:
- a first step of determining a recording order of data of the prescribed size so as to continuously record all the data of the prescribed size while the head goes and returns once in the radial direction of the disk; and
- a second step of controlling a position of the head in the radial direction of the disk so as to sequentially record the data of the prescribed size in the recording order wherein,
- in the first step, a first recording order is determined so that first to prescribed-numbered data of the prescribed size are sequentially positioned in the radial direction of the disk from a most outer circumference side toward a most inner circumference side of the disk or from the most inner circumference side toward the most outer circumference side,
- a second part recording order is determined so that next-numbered to last data of the prescribed size are sequentially positioned in the radial direction of the disk from the most inner circumference side toward the most outer circumference side of the disk or from the most outer circumference side toward the most inner circumference side of the disk, and
- the recording order is determined so that the second part recording order comes after the first part recording order or the first part recording order comes after the second part recording order.

14. A recording method of dividing data given from outside and recording the data on a disk with a head moving in a radial direction of the disk rotating, in response to a recording command given from the outside, said recording method comprising:
- a first step of determining a recording order of data of the prescribed size so as to continuously record all the data of the prescribed size while the head goes and returns once in the radial direction of the disk; and
- a second step of controlling a position of the head in the radial direction of the disk so as to sequentially record the data of the prescribed size in the recording order wherein,
- in the first step, a positional order is determined so that data of the prescribed size are sequentially positioned in the radial direction of the disk from a most outer circumference side toward a most inner circumference side of the disk or from the most inner circumference side toward the most outer circumference side of the disk,
- a third part recording order is determined by rearranging odd-numbered data of the prescribed size in the positional order, into a decreasing order or an ascending order, a fourth part recording order is determined by rearranging even-numbered data of the prescribed size in the positional order, into in the ascending order or the decreasing order, and
- the recording order is determined so that the fourth part recording order comes after the third part recording order or the third part recording order comes after the fourth part recording order.

15. A recording method of dividing data given from outside and recording the data on a disk with a head moving in a radial direction of the disk rotating, in response to a recording command given from the outside, said recording method comprising:
- a first step of determining a recording order of data of the prescribed, size so as to continuously record all the data of the prescribed size while the head goes and returns once in the radial direction of the disk; and
- a second step of controlling a position of the head in the radial direction of the disk so as to sequentially record the data of the prescribed size in the recording order wherein:
- the recording command is a recording command to record first and second data continuously; and
- in the first step, a fifth part recording order is determined so that data of the prescribed size composing the first data are sequentially positioned in the radial direction of the disk from a most outer circumference side toward a most inner circumference side of the disk or from the most inner circumference side toward the most outer circumference side of the disk,
- a sixth part recording order is determined so that data of the prescribed size composing the second data are sequentially positioned in the radial direction of the disk from the most inner circumference side toward the most outer circumference side of the disk or from the most outer circumference side toward the most inner circumference side of the disk, and
- the recording order is determined so that the sixth part recording order comes after the fifth part recording order.

16. A video server system comprising:
- means for receiving a reproduction command of first audio video data,
- wherein the first audio video data is first divided data and the second audio video data is second divided data;
- means for rearranging the first divided data of the first audio video data;
- means for means for rearranging the second divided data of the second audio video data;
- means for reading the first divided data in a corresponding readout order;
- means for means for reading the second divided data in a corresponding readout order;
- means for rearranging the first divided data into a corresponding reproduction order; and
- means for rearranging the second divided data into a corresponding reproduction order.

17. The apparatus as claimed in claim 16, wherein in the first divided data of the first audio video data in the readout order, the storage positions of the first divided data are sequentially arranged from an outer circumference side toward an inner circumference side of a disk.

18. The apparatus as claimed in claim 17 wherein the second divided data of the second audio video data in the readout order, the storage positions of the second divided data are sequentially arranged from the inner circumference side toward the inner circumference side of the disk.

19. The apparatus as claimed in claim 18 wherein reading the first audio video data and second audio video data a total seek distance of a head unit within each time slot can be shortened.

20. The apparatus as claimed in claim 16, wherein the means for rearranging the first divided data include a decoder.

* * * * *